US00RE50449E

(19) United States
(12) Reissued Patent
Sharp et al.

(10) Patent Number: US RE50,449 E
(45) Date of Reissued Patent: Jun. 3, 2025

(54) CONTROLLER AND METHOD FOR WIRELESS COMMUNICATION SYSTEM

(71) Applicant: Ocado Innovation Limited, Hatfield (GB)

(72) Inventors: David Sharp, Hatfield (GB); Joseph Zammit, Hatfield (GB)

(73) Assignee: OCADO INNOVATION LIMITED, Hatfield (GB)

(21) Appl. No.: 17/649,486

(22) Filed: Jan. 31, 2022

Related U.S. Patent Documents

Reissue of:
(64) Patent No.: 10,608,739
Issued: Mar. 31, 2020
Appl. No.: 16/462,678
PCT Filed: Nov. 13, 2017
PCT No.: PCT/EP2017/079015
§ 371 (c)(1),
(2) Date: May 21, 2019
PCT Pub. No.: WO2018/095751
PCT Pub. Date: May 31, 2018

(30) Foreign Application Priority Data

Nov. 22, 2016 (GB) ..... 1619748

(51) Int. Cl.
*H04B 17/327* (2015.01)
*H04B 10/00* (2013.01)
(Continued)

(52) U.S. Cl.
CPC ..... *H04B 17/327* (2015.01); *H04B 10/11* (2013.01); *H04B 10/116* (2013.01); *H04B 10/502* (2013.01); *H04B 17/24* (2015.01)

(58) Field of Classification Search
CPC ..... H04B 17/327; H04B 17/24; H04B 10/11; H04B 10/116; H04B 10/502
See application file for complete search history.

(56) References Cited

U.S. PATENT DOCUMENTS 6,509,992 B1 1/2003 Goodwill
6,570,524 B1 * 5/2003 Mullaly ..... H04B 10/1141 398/107
(Continued)

FOREIGN PATENT DOCUMENTS

CN 102156590 A 8/2011
JP H08138756 A 5/1996
(Continued)

OTHER PUBLICATIONS

Notification of Transmittal of the International Search Report (Forms PCT/ISA/220 and PCT/ISA/210) and the Written Opinion of the International Searching Authority (Form PCT/ISA/237) issued Feb. 20, 2018, by the International Application Division European Intellectual Property Office in corresponding International Application No. PCT/EP2017/079015. (14 pages).
(Continued)

*Primary Examiner* — Christina Y. Leung
(74) *Attorney, Agent, or Firm* — Buchanan Ingersoll & Rooney, PC

(57) ABSTRACT

To determine an intensity of emission to be emitted by each of a plurality of emitters in a wireless communication system based on a measured angle of rotation of tilt of the plurality of emitters, a controller is provided which can allow the intensity of emissions of each of the plurality of emitters to be varied in dependence upon the angle of tilt or rotation. This allows for the steering of the emissions from the plurality of emitters to maintain communications within the wireless communication system.

2 Claims, 14 Drawing Sheets

(51) Int. Cl.

| | |
|---|---|
| ***H04B 10/11*** | (2013.01) |
| ***H04B 10/116*** | (2013.01) |
| ***H04B 10/50*** | (2013.01) |
| ***H04B 17/24*** | (2015.01) |

(56) References Cited

U.S. PATENT DOCUMENTS

| | | | | |
|---|---|---|---|---|
| 6,775,480 | B1 | 8/2004 | Goodwill | |
| 7,197,213 | B2 * | 3/2007 | Graves | G02B 6/3512 385/16 |
| 10,471,597 | B1 * | 11/2019 | Murphy | B25J 9/1674 |
| 2002/0109884 | A1 | 8/2002 | Presley et al. | |
| 2003/0138193 | A1 * | 7/2003 | Sweatt | G02B 6/3524 385/17 |
| 2003/0228152 | A1 | 12/2003 | Takahashi et al. | |
| 2004/0184822 | A1 * | 9/2004 | Yamada | H04B 10/1141 398/202 |
| 2005/0041980 | A1 * | 2/2005 | Ueyanagi | H04B 10/1149 398/156 |
| 2005/0238356 | A1 | 10/2005 | Gilbert et al. | |
| 2009/0162071 | A1 | 6/2009 | Refai et al. | |
| 2010/0253519 | A1 * | 10/2010 | Brackmann | B60P 3/03 340/572.1 |
| 2011/0116805 | A1 | 5/2011 | Xia et al. | |
| 2012/0248316 | A1 | 10/2012 | Liang et al. | |
| 2013/0082162 | A1 * | 4/2013 | Eide | G01J 1/0407 250/203.3 |
| 2014/0086714 | A1 | 3/2014 | Malik | |
| 2014/0270791 | A1 | 9/2014 | Hyde et al. | |
| 2015/0195042 | A1 * | 7/2015 | Raskar | H04B 10/502 398/118 |
| 2015/0307276 | A1 * | 10/2015 | Hognaland | B66F 9/06 700/218 |
| 2016/0194151 | A1 | 7/2016 | Lindbo et al. | |
| 2016/0288280 | A1 * | 10/2016 | Lin | B25J 9/0096 |
| 2019/0305847 | A1 | 10/2019 | Sharp et al. | |

FOREIGN PATENT DOCUMENTS

| | | | |
|---|---|---|---|
| JP | H11252018 | A | 9/1999 |
| JP | 2016529181 | A | 9/2016 |
| JP | 2016183050 | A | 10/2016 |
| NO | 317366 | B1 | 10/2004 |
| WO | 9849075 | A1 | 11/1998 |
| WO | 2015019055 | A1 | 2/2015 |
| WO | 2015185628 | A2 | 12/2015 |
| WO | 2015193278 | A1 | 12/2015 |

OTHER PUBLICATIONS

Combined Search and Examination Report under Sections 17 and 18(3), dated Apr. 25, 2018, issued in the corresponding application GB1718684.2. (6 pages).

Patents Act 1977: Examination Report under Section 18 (3) dated Dec. 14, 2018, issued in the corresponding application GB1718684.2. (3 pages).

First Office Action issued on May 9, 2023, by the Japanese Patent Office in corresponding Japanese Patent Application No. 2022-046499, and an English Translation of the Office Action. (10 pages).

Office Action (Request for the Submission of an Opinion) issued on Apr. 25, 2023, by the Korean Patent Office in corresponding Korean Patent Application No. 10-2022-7025126, and an English Translation of the Office Action. (9 pages).

Office Action (Notice of Final Rejection) issued on Oct. 16, 2023, by the Korean Patent Office in corresponding Korean Patent Application No. 10-2022-7025126, and an English Translation of the Office Action. (6 pages).

Office Action (Examination Report No. 2) issued on Oct. 25, 2023, by the Australian Patent Office in corresponding Australian Patent Application No. 2022204490. (4 pages).

Office Action (Examination Report No. 1) issued on Jun. 22, 2023, by the Australian Patent Office in corresponding Australian Patent Application No. 2022204490. (7 pages).

Office Action issued on Aug. 8, 2023, by the Canadian Patent Office in corresponding Canadian Patent Application No. 3,044,496. (4 pages).

Office Action (Decision of Rejection) issued on Jan. 9, 2024, by the Japanese Patent Office in corresponding Japanese Patent Application No. 2022-046499, and an English Translation of the Office Action. (6 pages).

Aggarwal et al., "Design and Implementation of a Wireless Gesture Controlled Robotic Arm with Vision", International Journal of Computer Applications (0975-8887), (Oct. 2013), vol. 79, No. 13, pp. 39-43.

Dhepekar et al., "Wireless Robotic Hand for Remote Operations using Flex Sensor", 2016 International Conference on Automatic Control and Dynamic Optimization Techniques (ICACDOT) International Institute of Information Technology (I2IT), (Sep. 9-10, 2016), Pune, India, pp. 114-118.

Varghese et al., "Design and Wireless Control of Anthropomorphic Robotic Arm", IEEE Sponsored 2nd International Conference on Innovations in Information Embedded and Communication Systems, ICIIECS'15, (Mar. 19-20, 2015), Coimbatore, India. (4 pages).

Office Action (Examination report No. 3 for standard patent application) issued Dec. 11, 2023, by the Australian Government, IP Australia in corresponding Australian Patent Application No. 2022204490. (5 pages).

International Electronic Commission, "IEC 62591:2016 Industrial Networks—Wireless Communication Network and Communication Profiles—WirelessHARTTM TC 65/SC 65C Additional Information", Mar. 30, 2016, [Retrieved from Internet on Feb. 27, 2024] <URL:https://webstore.iec.ch/publication/24433>. (112 pages).

Office Action (Examination Report No. 4) issued on Feb. 28, 2024, by the Australian Patent Office in corresponding Australian Patent Application No. 2022204490. (5 pages).

Office Action issued on May 16, 2024, by the Canadian Patent Office in corresponding Canadian Patent Application No. 3,044,496. (3 pages).

First Office Action issued on Nov. 30, 2021, by the Chinese Patent Office in corresponding Chinese Patent Application No. 201780072095.X, and an English Translation of the Office Action. (12 pages).

Office Action (Communication) issued on Nov. 12, 2024, by the European Patent Office in corresponding European Patent Application No. 17 804 486.3. (7 pages).

Office Action (Communication) issued on Nov. 23, 2021, by the European Patent Office in corresponding European Patent Application No. 17 804 486.3. (9 pages).

International Search Report (PCT/ISA/210) dated Feb. 20, 2018, by the European Patent Office as the International Searching Authority for International Application No. PCT/EP2017/079015.

Written Opinion (PCT/ISA/237) dated Feb. 20, 2018, by the European Patent Office as the International Searching Authority for International Application No. PCT/EP2017/079015.

* cited by examiner

CONTROLLER AND METHOD FOR WIRELESS COMMUNICATION SYSTEM

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

This application claims priority from UK Patent Application No. GB1619748.5 filed 22 Nov. 2016, the content of all this application hereby being incorporated by reference.

TECHNICAL FIELD

The present invention relates generally to the field of wireless communications and more specifically to a controller and method for a wireless communications system.

BACKGROUND

In certain systems, wireless communications paths are used to communicate between two discrete objects within the system, or between two objects movably joined. In one example system, light based communications are used. A photo emitter is located on one object and a photo detector is positioned on the other object. The light is transmitted from the photo emitter in the direction of the photo detector.

It is a problem in such systems that relative movement between the photo emitter and photo detector may cause the emitted radiation to be emitted in a direction such that it is not incident on the desired photo detector. This can lead to miscommunications in the optical communications system.

In the case of a system in a vertical orientation, it may be possible to use a mechanical gimbal and gyroscope arrangement to ensure that photo emitter and photo receiver remain substantially vertical relative to one another even if the underlying supporting structure rotated; however, there is a need for smaller, more efficient and simpler solution.

SUMMARY

In view of the problems in known wireless communication systems, the present invention aims to provide a controller and method for such a wireless communication system such that wireless communications are maintained even when the emitters and receiver tilt relative to each other in one or more axes.

In general terms, the invention introduces control to alter the direction of emissions based on the amount of tilt or rotation in the emitters. In this way the emissions of the emitters are steered to the receiver even as the emitters and receiver rotate or tilt. According to the present invention there is provided a controller for a wireless communication system, the wireless communication system comprising: a plurality of emitters physically separated from each other, a first lens through which emissions from the plurality of emitters pass, a second lens through which the emissions passed through the first lens pass, at least one receiver, and a tilt sensor arranged to measure angle of tilt in at least one dimension of the plurality of emitters. The second lens is arranged to focus the emissions passed through the first lens onto the at least one receiver. The controller is arranged to determine an intensity of emission to be emitted by each of the plurality of emitters based on the measured angle of tilt in at least one dimension of the plurality of emitters, such that the emissions are incident on at least one selected at least one receiver.

The present invention also provides a wireless communication system comprising: a plurality of emitters physically separated from each other, a first lens through which emissions from the plurality of emitters pass, a second lens through which the emissions passed through the first lens pass, at least one receiver, a tilt sensor arranged to measure the angle of tilt in at least one dimension of the plurality of emitters, and a controller as previously described. The second lens is arranged to focus the emissions passed through the first lens onto the at least one receiver.

The present invention also provides a wireless communication system comprising: a first wireless communication system as previously described, and a second wireless communication system as previously described. The first and second wireless communication systems are arranged to perform bi-directional communications.

The present invention also provides a controller for a wireless communication system, the wireless communication system comprising: a plurality of emitters physically separated from each other, a first lens system co-located with the plurality of emitters through which emissions from the plurality of emitters pass, a second lens system through which the emissions passed through the first lens system pass, a plurality of receivers, a measurement means arranged to measure the intensity of emissions incident on each of the plurality of receivers, a transmission means co-located with the plurality of receivers, and a reception means co-located with the plurality of emitters. The second lens system is co-located with the plurality of receivers and arranged to focus the emissions passed through the first lens systems onto the plurality of receivers. The transmission means is arranged to transmit the measured intensities to the reception means. The controller is arranged to determine an intensity of emission to be emitted by each of the plurality of emitters based on the measured intensities, such that the emissions are incident on at least one selected receiver of the plurality of receivers.

The present invention also provides a wireless communication system comprising: a plurality of emitters physically separated from each other, a first lens system co-located with the plurality of emitters through which emissions from the plurality of emitters pass, a second lens system through which the emissions passed through the first lens system pass, a plurality of receivers, a measurement means arranged to measure the intensity of emissions incident on each of the plurality of receivers, a transmission means co-located with the plurality of receivers, a reception means co-located with the plurality of emitters, and a controller as previously described. The second lens system is co-located with the plurality of receivers and arranged to focus the emissions passed through the first lens systems onto the plurality of receivers. The transmission means is arranged to transmit the measured intensities to the reception means.

The present invention also provides a wireless communication system comprising: a first wireless communication system as previously described, and a second wireless communication system as previously described. The first and second wireless communication systems are arranged to perform bi-directional communications.

The present invention also provides a robotic warehousing system comprising: at least one robotic load handling means comprising a controlling means and a lifting means arranged to be lowered from within the robotic load handling means. The lifting means comprises a gripping means arranged to grip and lift a load, the load comprising a container. The robotic load handling means comprises a wireless communication system as previously described such that the lifting means communicates with the controlling means by way of the wireless communication system.

The present invention also provides a method of controlling a wireless communication system, the wireless communication system comprising: a plurality of emitters physically separated from each other, a first lens through which emissions from the plurality of emitters pass, a second lens through which the emissions passed through the first lens pass, at least one receiver, and a tilt sensor arranged to measure the angle of tilt in at least one dimension of the plurality of emitters. The second lens is arranged to focus the emissions passed through the first lens onto the at least one receiver. The method comprising the step of: determining an intensity of emission to be emitted by each of the plurality of emitters based on the angle of tilt in at least one dimension of the plurality of emitters, such that the emissions are incident on at least one selected at least one receiver.

The present invention also provides a method of controlling a wireless communication system, the wireless communication system comprising: a plurality of emitters physically separated from each other, a first lens system co-located with the plurality of emitters through which emissions from the plurality of emitters pass, a second lens system through which the emissions passed through the first lens system pass, a plurality of receivers, a measurement means arranged to measure the intensity of emissions incident on each of the plurality of receivers, a transmission means co-located with the plurality of receivers, and a reception means co-located with the plurality of emitters. The second lens system is co-located with the plurality of receivers and arranged to focus the emissions passed through the first lens systems onto the plurality of receivers. The transmission means is arranged to transmit the measured intensities to the reception means. The method comprising the step of: determining an intensity of emission to be emitted by each of the plurality of emitters based on the measured intensities, such that the emissions are incident on at least one selected receiver of the plurality of receivers.

In this way, wireless communication paths may be maintained between two objects movable relative to one another.

BRIEF DESCRIPTION OF THE DRAWINGS

Embodiments of the invention will now be described by way of example only with reference to the accompanying drawings, in which like reference numbers designate the same or corresponding parts, and in which.

DETAILED DESCRIPTION OF EMBODIMENTS

First Embodiment

Figure 1:
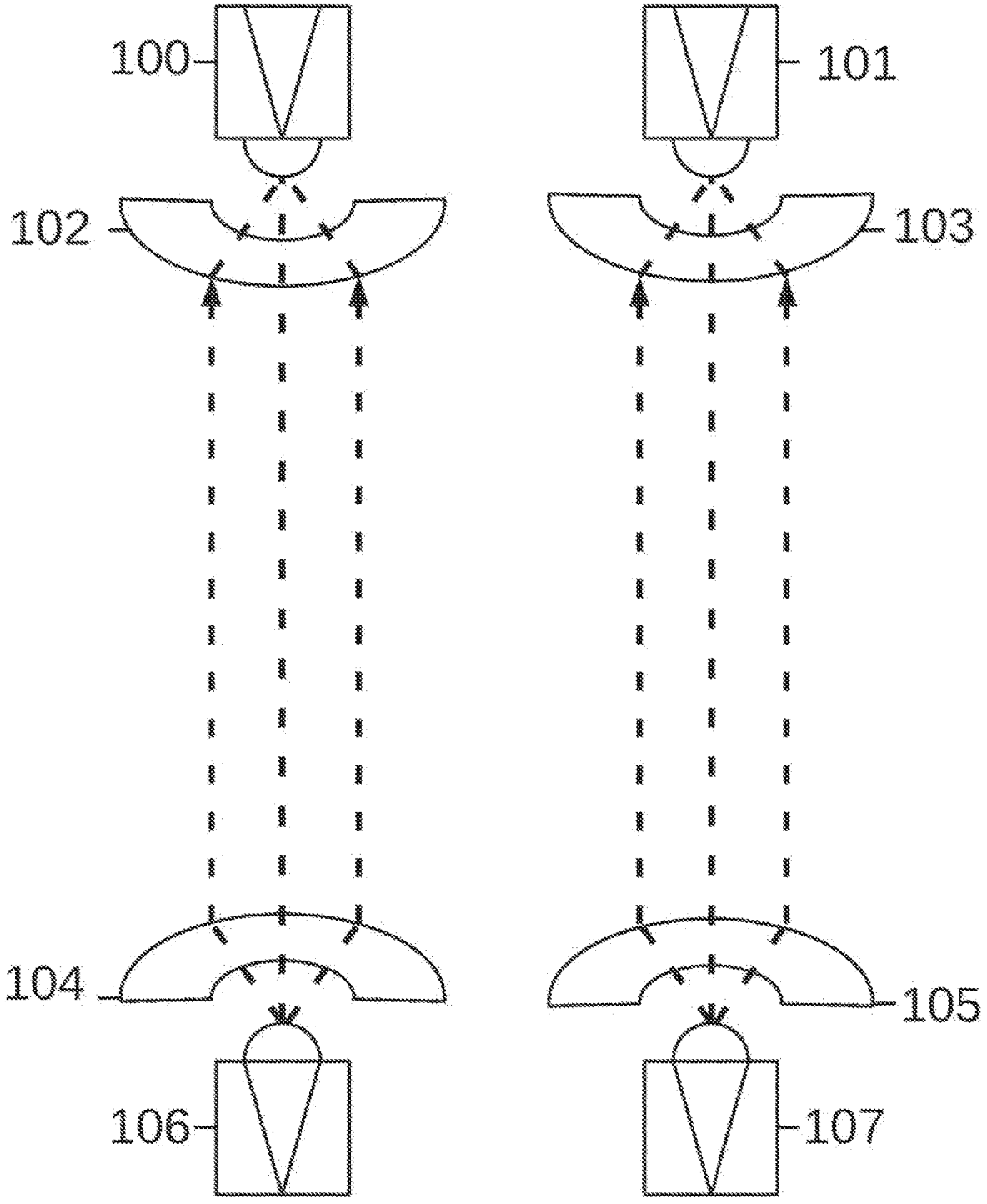
Figure 1 (Prior Art)
FIG. 1 is a schematic diagram showing wireless communication paths between two emitters and two receivers, the wireless communication paths including lens systems, according to a known wireless communication system.

FIG. 1 depicts a known wireless communication system. In this known system, an emitting apparatus communicates with a receiving apparatus. The receiving apparatus is spaced apart from the emitting apparatus, accordingly communications between the apparatuses cannot be conveniently achieved in the usual manner for example, by transmitting signals along a wire. Instead wireless communications are used between the emitting apparatus and the receiving apparatus.

The emitting apparatus comprises an emitter 106 and a first lens 104 which focusses the emission of the emitter 106. The emitter 106 receives a signal to be transmitted from a communicating device (not shown). The communicating device may be any device which is required to send data to a receiving device. The emitter 106 also includes an input which indicates the emitting intensity of the emitter 106. The emitting intensity input indicates the strength of emission output by the emitter 106.

The emission of the emitter 106 is generally emitted in a diverging form, in other words, the emission comes from a point source and emits in an up to 180 degree circular pattern. Accordingly, to direct the emissions in one direction towards the receiving apparatus the first lens 104 is provided to focus the emission into parallel or near parallel beams, and thereby travel in a single direction, which traverse the free space between the emitting apparatus and the receiving apparatus.

The receiving apparatus comprises a receiver 100 and a second lens 102 which focusses the emission from the emitting apparatus onto the receiver 100. In particular, the receiver 100 receives the emissions which are emitted by the emitter 106 and outputs a signal indicative of the input of the emitter 106 to a receiving device (not shown). The second lens 102 is provided to focus the parallel emissions onto the receiver 100.

FIG. 1 also shows a second wireless communication system. This operates identically to the above described wireless communication system. For ease of reference separate reference signs are provided for the parts of the second wireless communication system. In particular, a second emitting apparatus is shown with an emitter 107 and first lens 105. A second receiving apparatus comprises a receiver 101 and second lens 103 to receive the emission from the second emitting apparatus.

In normal operation the first and second wireless communication systems operate entirely independently, with each system providing a separate channel of communication between the respective emitter and receiver. As can be appreciated, if each of the first and second emitting apparatuses remain substantially horizontal relative to the respective first and second receiving apparatuses then emissions can be arranged spatially so as not to interfere with each other, as shown in FIG. 1.

Figure 2:
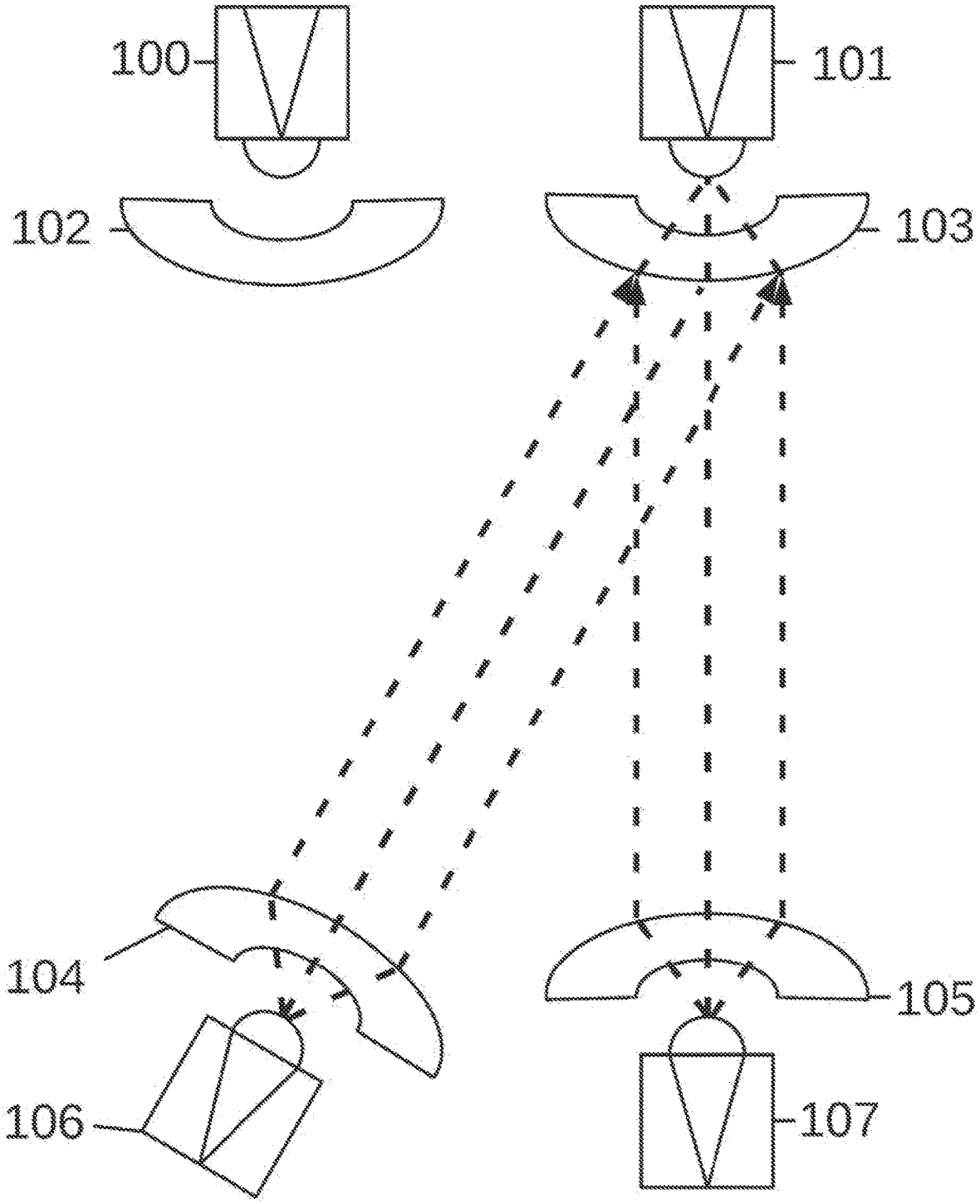
Figure 2 (Prior Art)
FIG. 2 is a schematic diagram of the system of FIG. 1 showing the effect of the relative movement of the emitter to the receiver, the emissions of the first emitter incorrectly falling incident on a second receiver, in a known wireless communication system.

FIG. 2, however, shows the results when the first emitting apparatus rotates or tilts relative to the first receiving apparatus, as well as rotating relative to the second emitting and receiving apparatuses. Accordingly, the emissions of the first emitting apparatus may interfere with the second receiving apparatus by being incident on a second receiver 101. In this case, the lens system 103 and receiver 101 may receive interference from the emissions of emitter 106 travelling through lens 104.

Similarly, the first receiving apparatus, as a result of the rotation or tilting, may fail to receive any emission from the emitter 106.

The first and second embodiments of the present invention relate to steering emissions from the emitter 106 such that the emissions continue to fall on the receiver, even if the emitter 106 and receiver 100 move (for example, rotate or tilt) relative to one another, such a situation may occur, for example, when the emitting apparatus tilts relative to the receiving apparatus.

Figure 3:
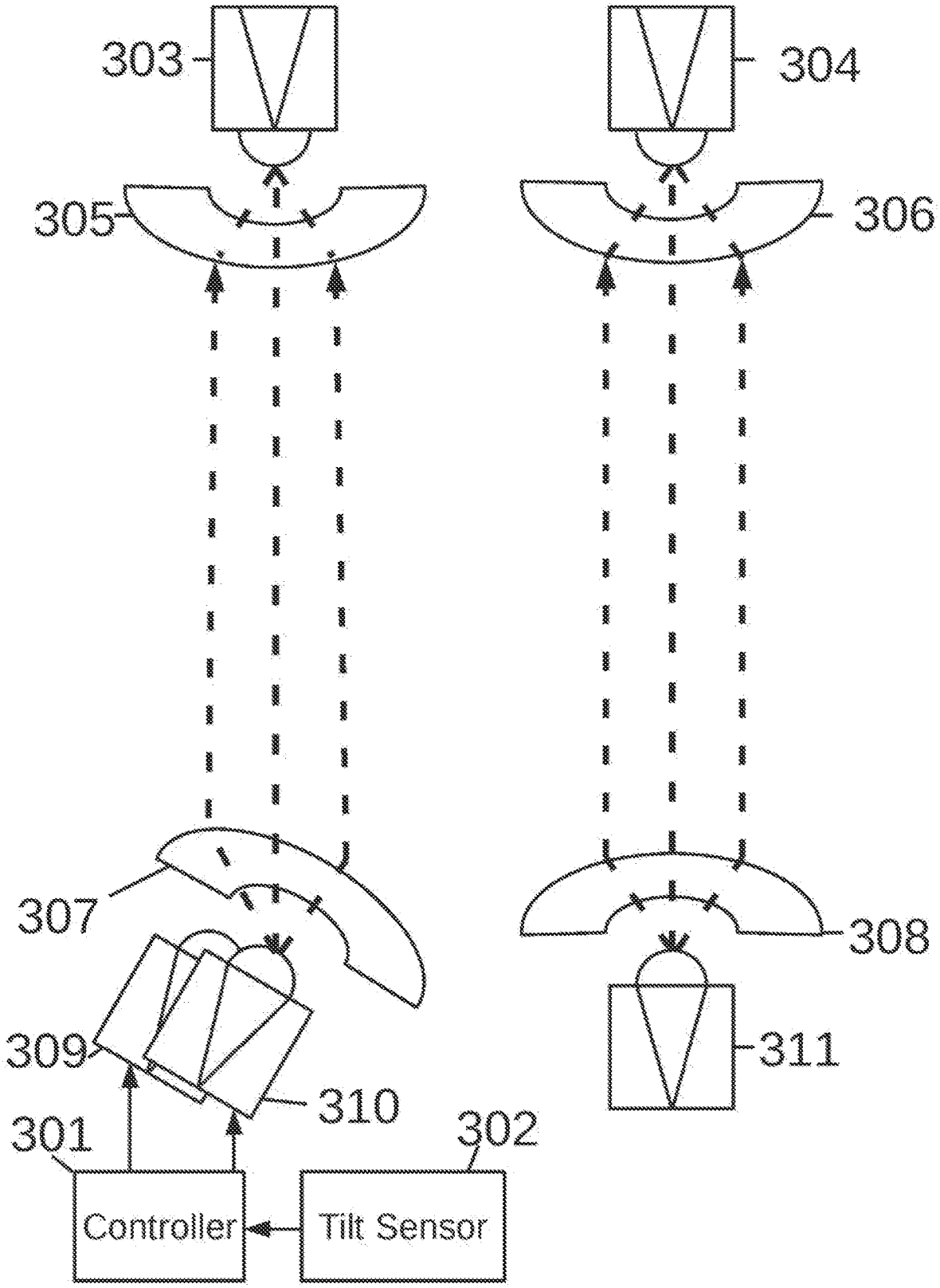
FIG. 3 is a schematic diagram showing a controller of a wireless communication system according to a first embodiment of the present invention, together with other features of the wireless communication system including a plurality of emitters.

FIG. 3 is a schematic drawing of a wireless communication system according to the first embodiment of the present invention and including a controller according to the first embodiment of the present invention.

In the first embodiment, the wireless communication system described above is supplemented by a second emitter 310 in the first emitting apparatus. Accordingly, the first emitting apparatus comprises a plurality of emitters 309 and 310. At least two emitters are needed, however, certain advantages are evident as the number of emitters increases, as will be described later.

The plurality of emitters 309 and 310 described here are fundamentally the same as previous described with reference to FIG. 1. In particular, each of the emitters is input with a data signal to be transmitted to a receiving apparatus. In this way the emissions from each of the plurality of emitters 309 and 310 may be synchronised. Each emitter is also input with a required intensity that each is to emit. In this regard, each emitter is controlled separately such that, for example, emitter 309 may emit at a maximum intensity whilst emitter 310 emits at a minimal intensity (which may be zero leading to no emissions). Similarly, any intensity between maximal and minimal intensity is envisaged to allow the steering of the synchronised emissions of the plurality of emitters 309 and 310. For example, emitter 309 may emit at 75% of maximal intensity whilst emitter 310 emits at 25% of maximal intensity so as to steer the emissions in one direction or another, towards or away from a particular receiver.

The plurality of emitters 309 and 310 are depicted physically separated from each other. The plurality of emitters may take one of many forms, for example, the plurality of emitters 309 and 310 may be formed into an emitter array. In this way, the plurality of emitters extend in both a first and second direction which are perpendicular to each other. This has the advantage of allowing the correction of rotations or tilts of the emitting apparatus in at least two different axes. However, the usage of two emitters allows for a minimal setup and still allows the correction of rotations or tilts of the emitting apparatus, as will be explained later.

The plurality of emitters 309 and 310 may be selected to emit emissions of a number of different types. For example, the plurality of emitters 309 and 310 may emit emissions within the infra-red spectrum. Similarly, the emissions may be radio frequency emissions with frequencies greater than 1 GHz. Alternatively, the emissions may be visible light or ultraviolet emissions.

As will be explained the control of a plurality of emitters 309 and 310 may be used to produce emissions that, when focussed through lenses 307 and 305, results in the emissions falling on the receiver 303 and not interfering with receiver 304.

The emissions of the plurality of emitters 309 and 310 are focussed through a first lens 307. The first lens 307 has the effect of forming a beam from the emissions from the plurality of emitters 309 and 310. In the beam, the emissions are substantially parallel so as to travel in a single direction, in this case vertically because the emitting apparatus and receiving apparatus are arranged in a vertical plane. As will be appreciated, any direction of emission can be accommodated with the first lens 307 forming the emissions in a beam moving in any single direction.

The beam of emissions traverses the free space between the emitting apparatus and the receiving apparatus. A second lens 305 refocuses the beam of emissions onto at least one receiver 303.

The first and second lenses 307 and 305 are selected depending on the type of emissions emitted by the plurality of emitters 309 and 310. For example, a glass lens may be used for emissions in the visible spectrum. For radio frequency emissions with frequencies greater than 1 GHz an array of appropriate emitter antennae and di-electric or meta-material radio frequency lenses may be used. Similarly, for emissions in the infra-red spectrum or ultraviolet spectrum an appropriate lens is selected.

The second lens 305 and receiver 303 are fundamentally similar to that described with reference to FIGS. 1 and 2. In particular, the receiver 303 outputs a signal to a receiving device. Ideally, if reception has been performed adequately, the received signal is identical to the signal input into the plurality of emitters 309 and 310. Although only one receiver is depicted in the first wireless communication system of FIG. 3, a plurality of receivers may be provided which leads to the advantage of greater likelihood of reception of the emissions, even when large rotations or tilts are applied to the emitting apparatus. Additionally, the emissions of the plurality of emitters 309 and 310 may be focussed by the first and second lenses 307 and 305 so as to focus the emissions on a number greater than one of receivers when more than one receiver is used, for example, to focus the emissions on two receivers located adjacent to one another.

The wireless communication system of the first embodiment further comprises a tilt sensor 302 co-located with the controller 301, the plurality of emitters 309 and first lens 307, in the emitting apparatus. The tilt sensor 302 is arranged to measure angles of rotations or tilts of the emitting apparatus and then output an indication of the tilt or rotation to the controller 301. The tilt sensor 302 may be specifically arranged to measure the angles of tilt or rotation of the plurality of emitters 309 and 310. In this regard, the tilt sensor 302 may measure tilt or rotation in at least one of three principal axes (each axis being perpendicular to the other two axes). Accordingly, three tilt sensors may be employed, each measuring tilt or rotation in a single axis and each positioned perpendicular to the other two tilt sensors.

The tilt sensor 302 may be one of many forms, for example, an accelerometer, a gyroscope or other tilt angle measurer may be employed.

The controller 301 according to the first embodiment of the present invention is provided in the wireless communication system and is connectable to the tilt sensor 302 to thereby receive an indication of tilt in at least one dimension of the plurality of emitters 309 and 310. In some use cases it may be preferable to employ a tilt sensor 302 arranged to measure tilt angles in at least two dimensions of the plurality of emitters 309 and 310.

The controller 301 is also connectable to the plurality of emitters 309 and 310 to thereby control the intensity of their emission by instructing each of the plurality of emitters 309 and 310 to emit a signal to be emitting with an intensity specific to each of the plurality of emitters 309 and 310.

As will now be described, when the emitting apparatus comprising the plurality of emitters 309 and 310 becomes tilted or rotated at an angle then the controller is arranged to determine an intensity of emissions to be emitted by each of the plurality of emitters based on the measured angle of tilt or rotation of the plurality of emitters 309 and 310.

More specifically, as depicted in FIG. 3, when the emitting apparatus rotates in a clockwise direction the intensity of emission from emitter 309 is reduced whilst the intensity of emission from emitter 310 is increased. In this way, together with the first lens 307, the beam is steered to fall on receiver 303. Accordingly the problem presented in FIG. 2 of the emission from emitter falling (and creating unwanted interference) on receiver 101 is mitigated.

As will be appreciated, were the rotation to occur in an anti-clockwise direction the controller 301 would change the intensity of emission to compensate for this change. For example, the controller 301 would reduce the intensity of emission from emitter 310 and increase the intensity of emission from emitter 309.

Figure 4:
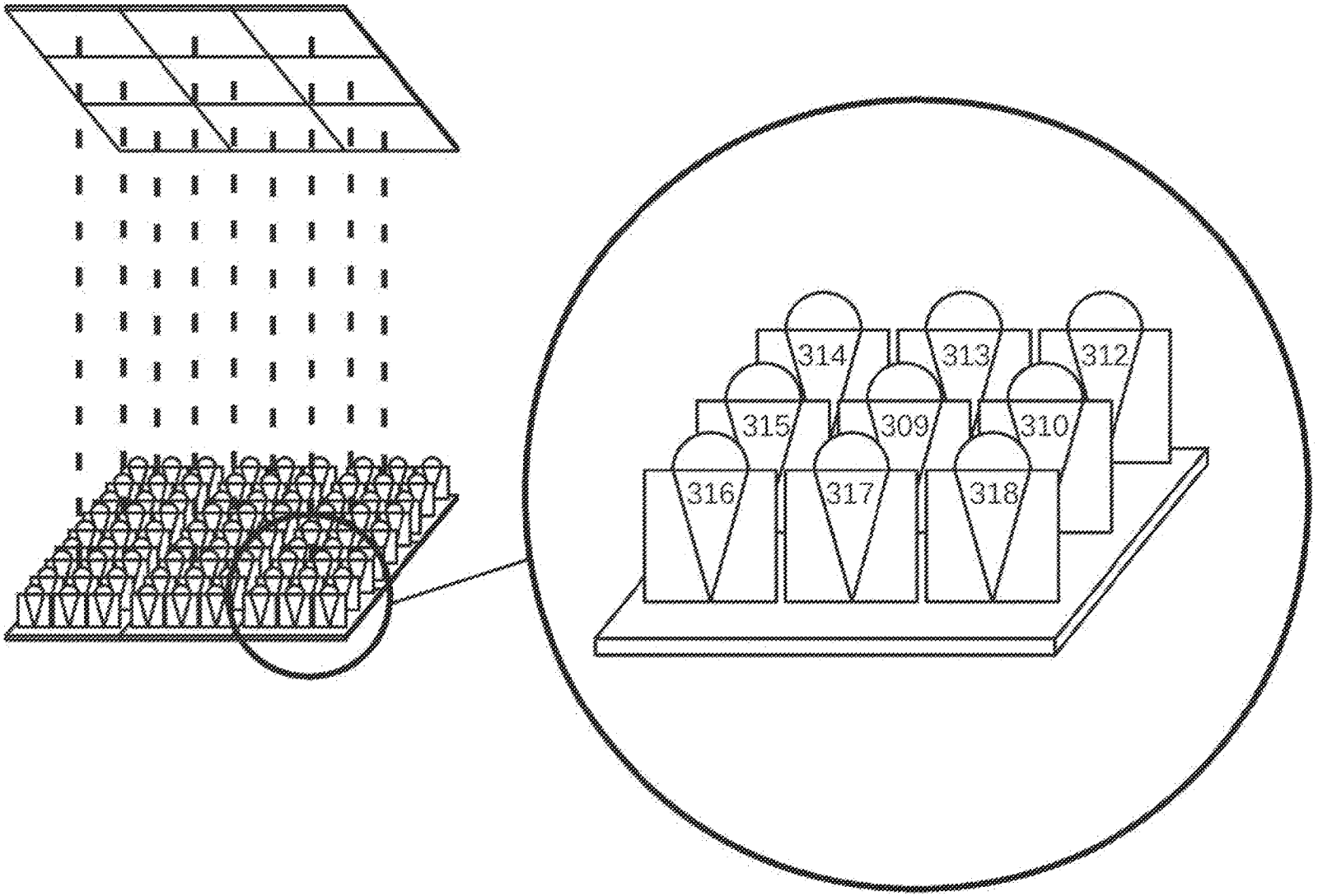
FIG. 4 is a schematic diagram of the plurality of emitters of FIG. 3, showing individual emitters formed within an emitter array.

FIG. 4 shows a further development of the emitting apparatus depicted in FIG. 3. In particular, the emitting apparatus may be implemented as a two-dimensional array of emitters, instead of two discrete emitters. In particular, a grouping of, for example, nine emitters would form one single beam emitting towards the at least one receiver.

The use of an array of emitters allows for the correction of tilt or rotation of the emitting apparatus in at least two directions. For example, when the emitting apparatus is horizontal, the emitter 309 could be a primary emitter for emission to the at least one receiver. However, as the emitting apparatus tilts and rotates the controller 301 is arranged to change the intensity of each of the nine emitters in the array of emitters to ensure the steering of the beam to the at least one receiver.

As depicted in FIG. 4, nine of the array of emitters are grouped into one large array. In this way, nine separate wireless communication systems are joined together. A controller 301 steers each of the nine arrays so that their emissions are directed towards the correct at least one receiver.

It is also to be appreciated that two adjacent emitters, such as 309 and 310 may each have their intensity set with a proportion of the desired intensity in order to produce a beam that behaves as if it had come from a emitter placed physically between emitter 309 and 310, for example, if each of emitters 309 and 310 emit with 50% of the maximum intensity this would effectively produce a beam with 100% intensity but located half-way between emitter 309 and 310. In this way, smaller corrections to the direction of the beam can be achieved with the beam being steered to positions that would otherwise correspond to positons between each of the plurality of emitters, thereby increasing the resolution of beam steering.

Second Embodiment

Figure 5:
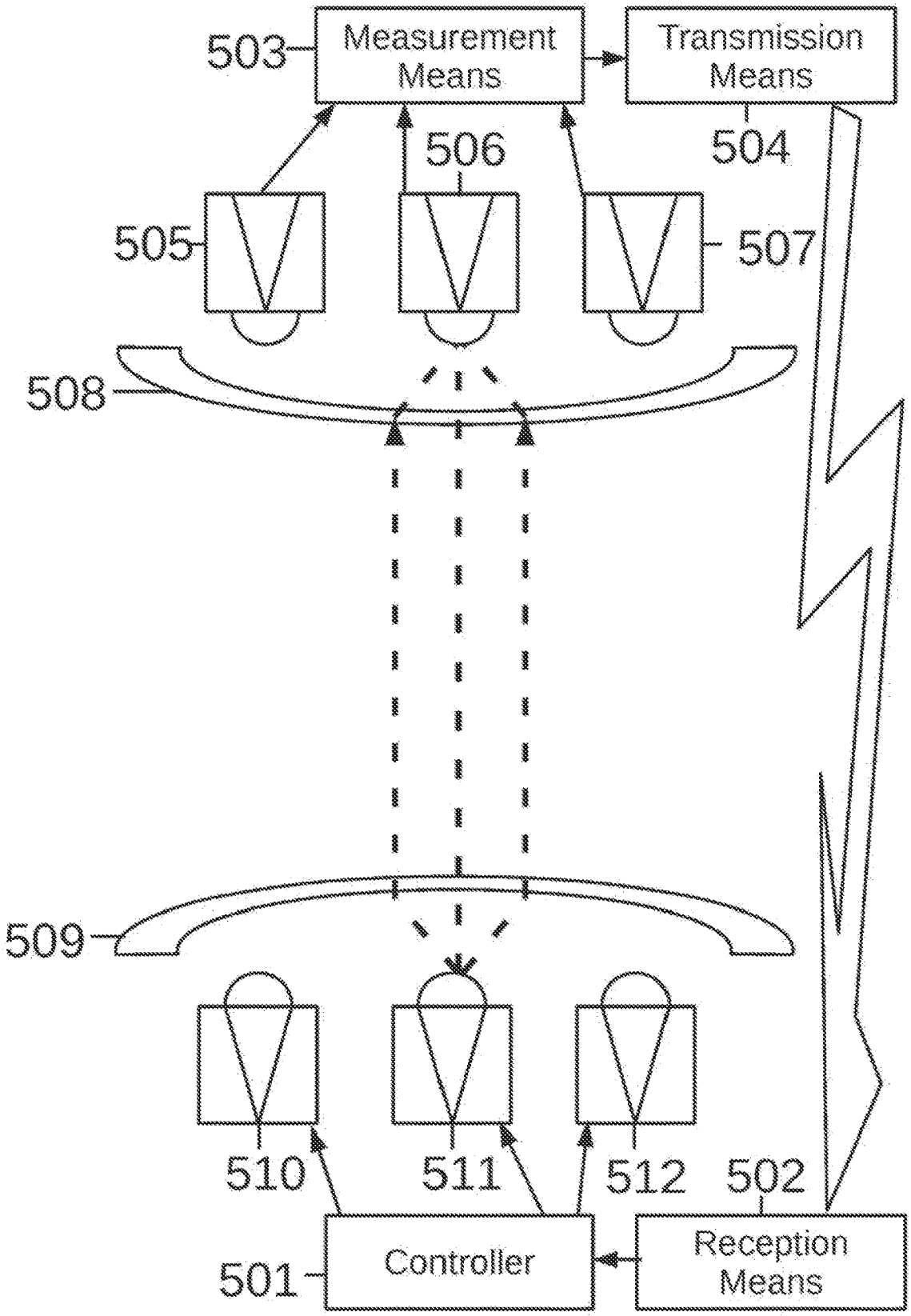
FIG. 5 is a schematic diagram of a controller of a wireless communication system according to a second embodiment of the present invention, together with other features of the wireless communication system.

FIG. 5 shows a second embodiment of the present invention with an alternative implementation of the controller and wireless communication system as described in the first embodiment.

In the second embodiment, the emitting apparatus is similar to that described for the first embodiment. In particular, the emitting apparatus comprises a plurality of emitters 510, 511 and 512, each of which receives a common input signal to be emitted and also an intensity of emission signal to control the intensity of emission from each emitter. The emissions are focussed by a first lens system 509 which is co-located with the plurality of emitters. The first lens system 509 focusses the emissions of the plurality of emitters 510, 511 and 512 so as to form a beam in which the emissions are parallel.

The beam of emission from the plurality of emitters 510, 511 and 512 are emitted to the receiving apparatus. In this embodiment, the receiving apparatus comprises a second lens system 508 and a plurality of receivers 505, 506 and 507. The second lens system 508 is arranged to focus the beam of emission onto the plurality of receivers and specifically onto a specific one receiver of the plurality of receivers, for example the receiver 506 which is centrally located in the plurality of receivers.

In an advantageous embodiment, the emissions of the plurality of emitters 510, 511 and 512 may be focussed by the first and second lens systems 509 and 508 so as to focus the emissions on a number greater than one of receivers, for example, to focus the emissions on two receivers located adjacent to one another. Accordingly, in this embodiment emissions are not focussed onto a specific one receiver.

The plurality of emitters may be selected to emit emissions of a number of different types. For example, the plurality of emitters may emit emissions within the infra-red spectrum. Similarly, the emissions may be radio frequency emissions with frequencies greater than 1 GHz. Alternatively, the emissions may be visible light or ultraviolet emissions.

The first and second lenses systems are selected depending on the type of emissions emitted by the plurality of emitters. For example, a glass lens may be used for emissions in the visible spectrum. For radio frequency emissions with frequencies greater than 1 GHz an array of appropriate emitter antennae and di-electric or meta-material radio frequency lenses may be used. Similarly, for emissions in the infra-red spectrum or ultraviolet spectrum an appropriate lens is selected.

Similar to the receivers described in the first embodiment, each of the receivers outputs the received signal.

The receiving apparatus further comprises a measurement means 503 arranged to measure the intensity of emissions incident on each of the plurality of receivers. In particular, the measurement means 503 is arranged to receive the signal output by each of the receivers and to measure the intensity of signal from each of the receivers. In this way the measurement means 503 acquires information of the strength of emission incident on each of the plurality of receivers 505, 506 and 507.

The receiving apparatus further comprises a transmission means 504 whilst the emitting apparatus also comprises a reception means 502 arranged to receive a signal from the transmission means 504.

The transmission means 504 is arranged to receive the measured intensities of emissions for each of the plurality of receivers 505, 506 and 507 from the measurement means 503. The transmission means 504 is arranged to transmit the measured intensities of emissions for each of the plurality of receivers 505, 506 and 507 to the reception means 502 of the emitting apparatus. In this way, the emitting apparatus receives an indication of the intensity of emission incident upon each of the plurality of receivers 505, 506 and 507.

The reception means 502 of the emitting apparatus is arranged to receive the transmitted signal including the indication of the intensity of emissions. The emitting apparatus further comprises the controller 501 according to the second embodiment of the present invention. The controller 501 is arranged to receive the indication of the intensity of emissions as received by the reception means 502.

The transmitting means 504 and reception means 502 are respectively arranged to transmit and receive signals using any one of a number of communication methods. For example, the transmitting means 504 may be arranged to transmit radio frequency transmissions, for example, Wi-Fi signals in the 2.4 GHz band of the radio spectrum. Alternatively, the transmission means 504 may be arranged to use any other convenient radio frequency band suitable for the environment in which the wireless communication system is operating. Alternatively, the transmission means 504 may be arranged to use light transmission, for example, Li-Fi, to transmit signals. The optical transmissions may be in the infra-red spectrum, visible light spectrum or ultraviolet spectrum. As will be appreciated, the reception means 502 will necessarily be arranged to receive the transmissions of the transmission means 504 in a corresponding manner, so, for example, if the transmission means 504 is arranged to transmit optical transmissions then the reception means 502 is arranged to receive optical transmissions. Similarly, if the transmission means 504 is arranged to transmit radio frequency transmissions then the reception means 502 is arranged to receive radio frequency transmissions.

An alternative to the above described radio frequency and optical transmission solutions is to utilise a second wireless communication system as described above according to either the first or second embodiment of the present invention. More specifically, the emitting apparatus of the second wireless communication system, including the plurality of emitters would be used in place of the transmission means 504 and the receiving apparatus of the second wireless communication system would be used in place of the reception means 502. This has the advantage of providing a wireless communication system which is immune to rotations and tilting of the emitting apparatus.

The controller 501 according to the second embodiment is connectable to the reception means 502 as well as each of the plurality of emitters 510, 511 and 512.

The controller 501, having received the indication of the intensity of emissions is arranged determine an intensity of emission to be emitted by each of the plurality of emitters based on the measured intensities. More specifically, the controller 501 determines individual emission intensities for each of the plurality of emitters 510, 511 and 512 based on the measured intensities. In this way the emissions of the plurality of emitters is successfully steered based on the measured intensities.

For example, when the emitting apparatus is substantially horizontal relative to the receiving apparatus then the beam is steered, by the controller 501, to travel from emitter 511 and arrive at receiver 506. In this example, the beam is steered to be vertical relative to the plurality of emitters 510, 511 and 512 and to thereby travel directly to the plurality of receivers. The controller 501 may determine to set the intensity of emission of emitter 511 to maximum and to set the intensity of emission of each of emitters 510 and 512 to zero. In this way the beam is only emitted by emitter 511 resulting in a beam which travels vertically to emitter 506.

As will be appreciated, setting the intensity of emission of each of the plurality of emitters 510, 511 and 512 to non-zero values results in successful steering of the beam in any direction desired. For example, if the intensity of emission of emitters 510 and 511 are made equal and non-zero then the beam is steered towards emitter 510 effectively creating "a virtual emitter" between emitters 510 and 511.

Figure 6:
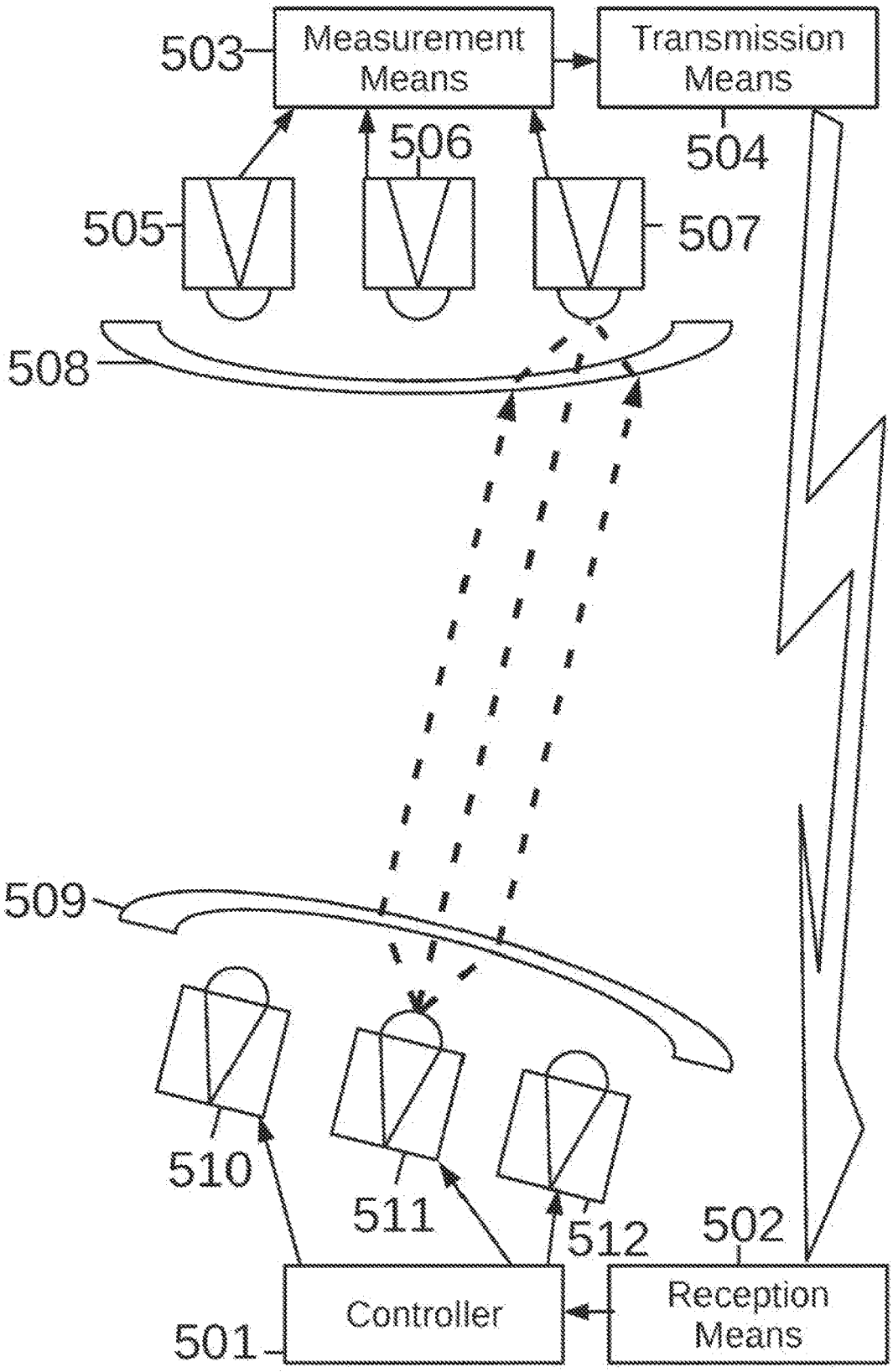
FIG. 6 is a schematic diagram of the system of FIG. 5 showing the effect of relative movement between the emitters and the receivers.

FIG. 6 shows the result of a rotation or tilting of the emitting apparatus. As can be seen, due to the rotation of tilting of the emitting apparatus the emissions from emitter 511 are now no longer incident upon receiver 506 as shown in FIG. 5. Therefore, the intensity of emissions incident on each of the plurality of receivers and as measured by the measurement means 503 changes. Previously, as shown in FIG. 5, the measurement means 503 would measure the maximal incident intensity as being on receiver 506. However, the rotation or tilt of the emitting apparatus causes the measurement means 503 to now detect the maximal incident intensity as being on receiver 507. This change in measured intensities is sent to the transmission means 504 which is turn transmits a signal including an indication of the measured intensities to the reception means 502.

In turn, the controller 501 receives from the reception means 502 the updated values of measured intensities incident on each of the plurality of receivers 505, 506 and 507.

Figure 7:
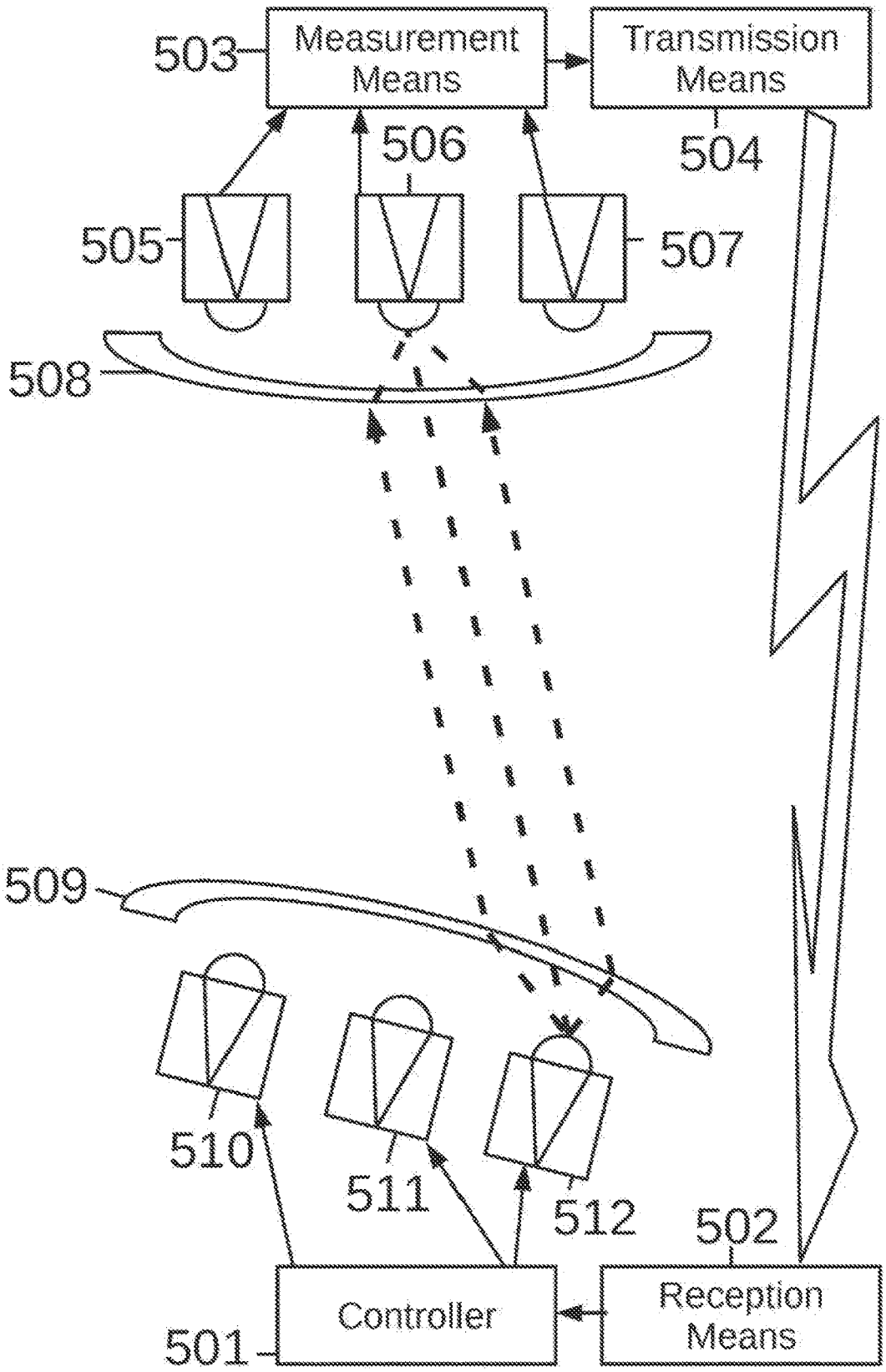
FIG. 7 is a schematic diagram of the system of FIGS. 5 and 6 showing the system correcting for the relative movement between the receivers and the emitters.

The controller 501 is thereby arranged to determine new intensities of emission to be emitted by each of the plurality of emitters 510, 511 and 512. The controller 501 is arranged to apply each of the newly determined intensities of emissions to their respective emitter of the plurality of emitters. In this way the beam is re-centered on the central receiver 506, as shown in FIG. 7. In particular, as shown in FIG. 7, emitter 512 is set to a maximal emission intensity whilst the emission intensity from emitters 510 and 511 is reduced. Accordingly, the beam, when focussed through lens 509, is successfully steered back toward the central receiver 506.

As will be appreciated, the controller 501 need not discretely control the intensity of each of the plurality of emitters but instead set the intensity of emissions of each of the emitters to an intermediate value between minimum and maximum intensity of emission. In this way, the beam can be effectively steered to any one of the plurality of receivers.

Figure 8:
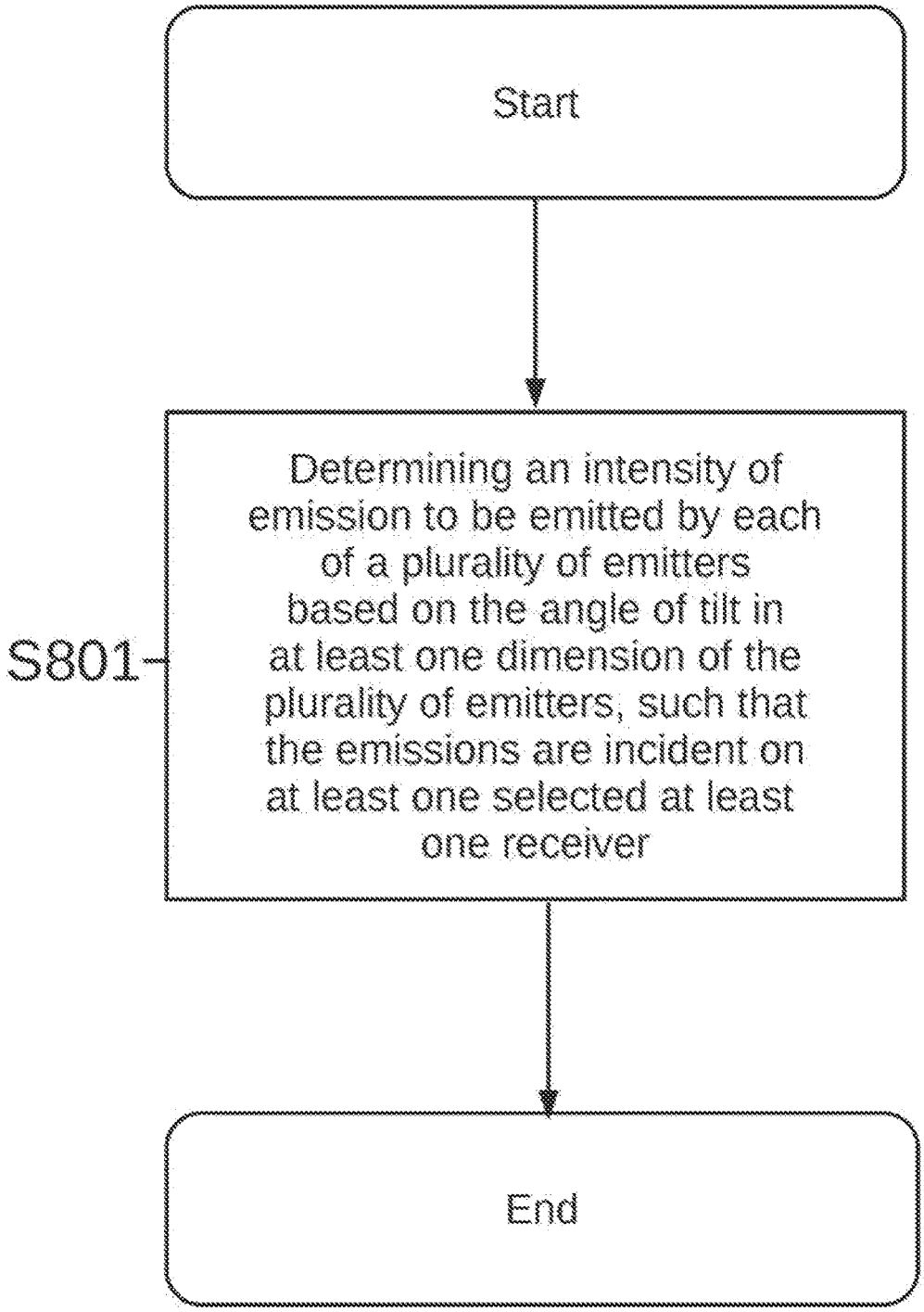
FIG. 8 is a flowchart showing the process performed by the controller according to the first embodiment of the present invention.

FIG. 8 shows a method for controlling a wireless communication system according to the first embodiment. The method pertains to a wireless communication system, as depicted in FIG. 3, comprises a plurality of emitters physically separated from each other. A first lens is a lens through which emissions from the plurality of emitters pass. The beam of emissions formed by the first lens then pass through the free space separating an emitting side of the wireless communication system from a receiving side of the wireless communication system. In this regard, the first lens is arranged to ensure that the beam is provided vertically with respect to the plurality of emitters such that the emissions are parallel thereby forming a beam. A second lens is formed at the receiving side to capture the emissions of the plurality of emitters and focussed by the first lens. The receiving side comprises at least receiver upon which the second lens is arranged to focus the emissions.

The emitting side further comprises a tilt sensor to measure angle of tilt in at least one dimension of the plurality of emitters and by extension the emitting side. In a preferable embodiment the tilt sensor is arranged to measure angles of tilt in at least two dimensions. The controller is arranged to perform the step S801 of determining an intensity of emissions to be emitted by each of the plurality of emitters based on the angles of tilt of the plurality of emitters as measured by the title sensor. In this way, the emissions are incident on at least one selected at least one receiver.

Figure 9:
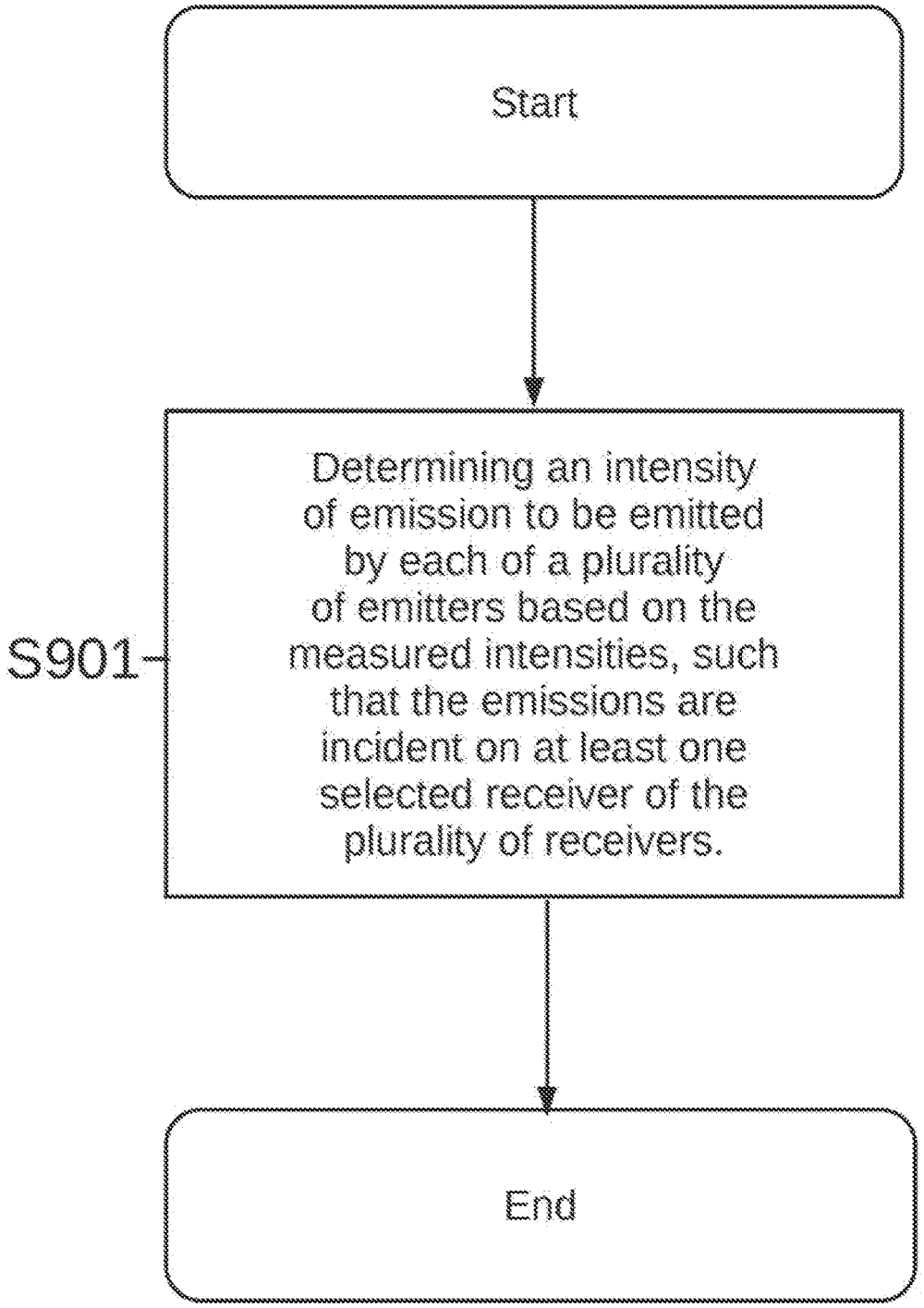
FIG. 9 is a flowchart showing the process performed by the controller according to the second embodiment of the present invention.

FIG. 9 shows a method for controlling a wireless communication system according to the second embodiment. The method pertains to a wireless communication system, as depicted in FIG. 5, comprises a plurality of emitters physically separated from each other. A first lens is a lens through which emissions from the plurality of emitters pass. The beam of emissions formed by the first lens then pass through the free space separating an emitting side of the wireless communication system from a receiving side of the wireless communication system. In this regard, the first lens is arranged to ensure that the beam is provided vertically with respect to the plurality of emitters such that the emissions are parallel thereby forming a beam. A second lens is formed at the receiving side to capture the emissions of the plurality of emitters and focussed by the first lens. The receiving side comprises a plurality of receivers upon which the second lens is arranged to focus the emissions.

The emitting side further comprises a measurement means arranged to measure the intensity of emissions incident on each of the plurality of receivers. The signal indicative of the measured intensities of emissions for each of the plurality of receivers is transmitted from the receiving side to the emitting side by a transmission means.

The emitting side further comprises a receiving means arranged to receive the signal indicative of the emissions incident upon each of the plurality of receivers. The controller is arranged to perform the step S901 of determining an intensity of emission to be emitted by each of a plurality of emitters based on the measured intensities. In this way, the beam is controlled so that the emissions are incident on at least one selected receiver of the plurality of receivers.

Modifications and Variations

Many modifications and variations can be made to the embodiments described above, without departing from the scope of the present invention.

Regarding the first embodiment, it is to be appreciated that the wireless communication system could include more than one receiver. This is advantageous because it provides reception even when the receiving apparatus tilts or rotates.

Applicable to both the first and second embodiments, the choice of receiver (or the gain used on each of several receivers) of a plurality of receivers may be adjusted according to the tilt of the receiving platform in at least one dimension, preferably two dimensions, so as to maximise the strength of the received signal and to minimise the reception of unwanted interference. In this modification, a controller connectable to each of a plurality of receivers and a tilt sensor co-located in the receiving apparatus would be arranged to adjust the gain of each receiver based on the measured tilt in at least one dimension, preferably two dimensions, of the plurality of receivers. Accordingly, even as the receiving apparatus tilts or rotates the signal from the plurality of receivers can be selectively amplified so as to accurately decode the beam from the emitters rather than other stray incident light from other directions (i.e. emissions that is not the vertical beam from the emitter).

It will be appreciated that the lens systems may comprise any number of lenses and need not be limited to the lens types or numbers shown in the Figures or described above. Any lens system capable of focussing the radiation emitted by the emitters on the receiver is envisaged.

Furthermore, the emitter may comprise two or more individual emitters for example discrete Light Emitting Diodes or the emitter may comprise an array of emitters. In a similar manner, the receiver may comprise discrete components or a suitably arranged array of receivers. The number of discrete components in the emitter or receiver arrays need not be limited to the number shown in the Figures, any suitable number of discrete components may be used to make up the arrays.

As described above, the controller of the first and second embodiments has been arranged to control the beam of emissions so that emissions are vertical relative to the plurality of emitters. However, this has only been described for ease of understanding and other possibilities are considered.

For example, the controller of the first and second embodiments may be arranged to control the beam so that emissions are not vertical and instead emissions are directed to a specific part of the receiving means, for example, to a specific receiver on the receiving means. This provides the advantage of allowing directed communications irrespective of the tilt or rotation of the receiving means. In other words, the controller may be arranged to control the beam so that it traverses the free space between the emitting apparatus and the receiving apparatus not at a 90 degree angle, in other words not vertically. Instead, the beam may be steered at an angle less than or greater than 90 degrees, for example in a substantially horizontal direction, which corresponds with an angle substantially zero degrees or substantially 180 degrees. As will be appreciated, any angle between vertical and horizontal may be accommodated by the controller controlling the emission intensity of each of the plurality of emitters to accommodate the desired angle.

Similarly, it is envisaged to provide more control of the plurality of emitters so that the beam arrives at the same receiver so as to achieve a specific signalling effect. In this way, emissions from different ones of the plurality of emitters may interact at one specific receiver to provide an advantageous effect. For example, emissions from a first emitter may interfere with emissions from a second emitter of the same plurality of emitters to cause constructive or destructive interference of the light/radio frequency emission that arrives at the at least one selected receiver.

Similarly, the emissions may be controlled to only arrive at a specific receiver in a specific time window. For example, a first emitter may emit during even time periods, such as t0, t2, t4 etc. On the other hand, emissions from a second emitter may be configured to arrive at the specific receiver in odd time periods such as t1, t3, t5 etc. In this way, more than one communication is possible at the same time in the wireless communication system. It is envisaged that a point-to-point optical/radio frequency network may be formed by such means.

Online retail businesses selling multiple product lines, such as online grocers and supermarkets, require systems that are able to store tens or even hundreds of thousands of different product lines. The use of single-product stacks in such cases can be impractical, since a very large floor area would be required to accommodate all of the stacks required.

Furthermore, it can be desirable only to store small quantities of some items, such as perishables or infrequently-ordered goods, making single-product stacks an inefficient solution.

International patent application WO 98/049075A (Autostore), the contents of which are incorporated herein by reference, describes a system in which multi-product stacks of containers are arranged within a frame structure.

PCT Publication No. WO2015/185628A (Ocado) describes a further known storage and fulfilment system in which stacks of bins or containers are arranged within a framework structure. The bins or containers are accessed by load handling devices operative on tracks located on the top of the frame structure. The load handling devices lift bins or containers out from the stacks, multiple load handling devices co-operating to access bins or containers located in the lowest positions of the stack. A system of this type is illustrated schematically in FIGS. 10 to 13 of the accompanying drawings.

Figure 10:
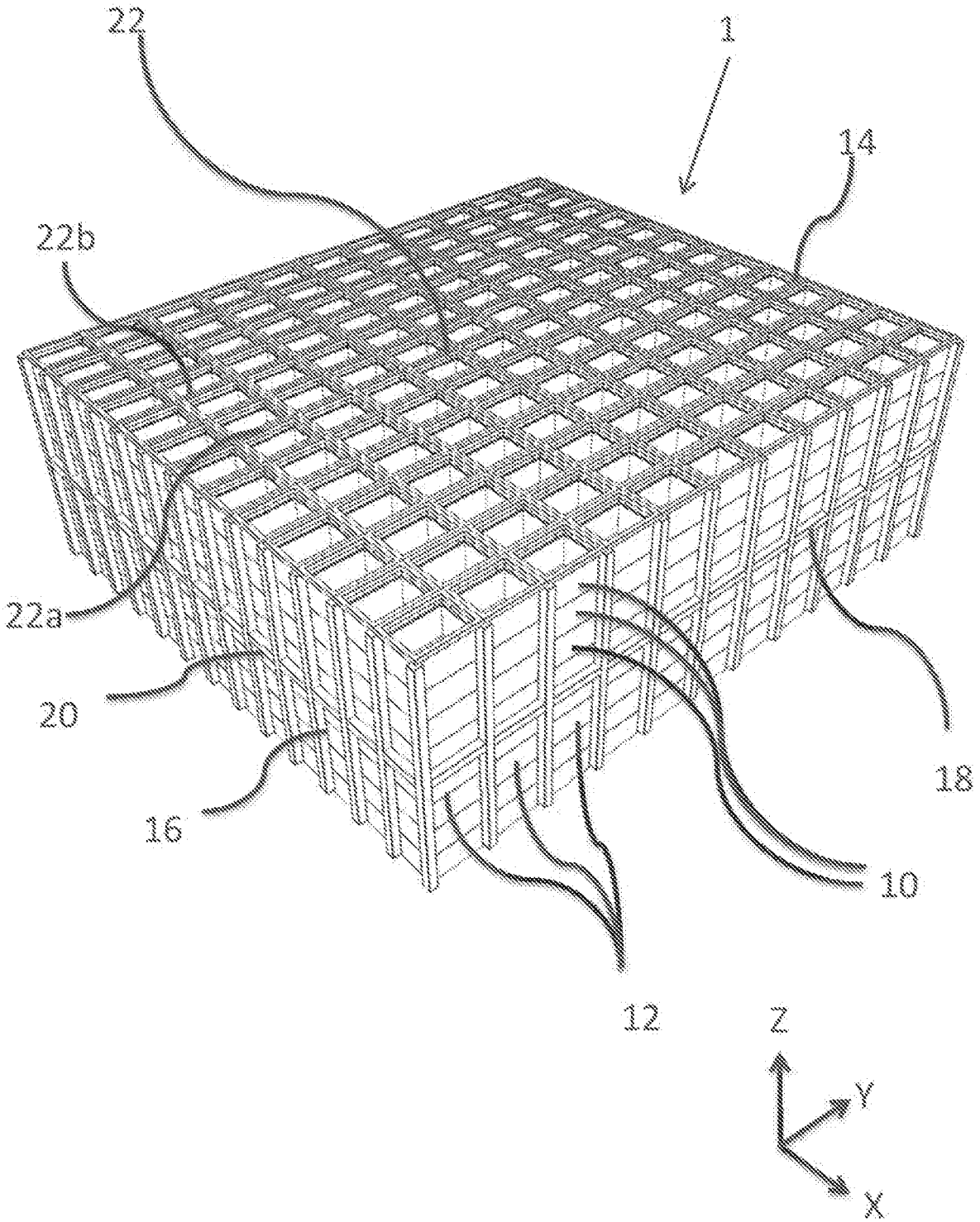
Figure 10 (PRIOR ART)
FIG. 10 is a schematic perspective view of a frame structure for housing a plurality of stacks of bins in a known storage system.
Figure 11:
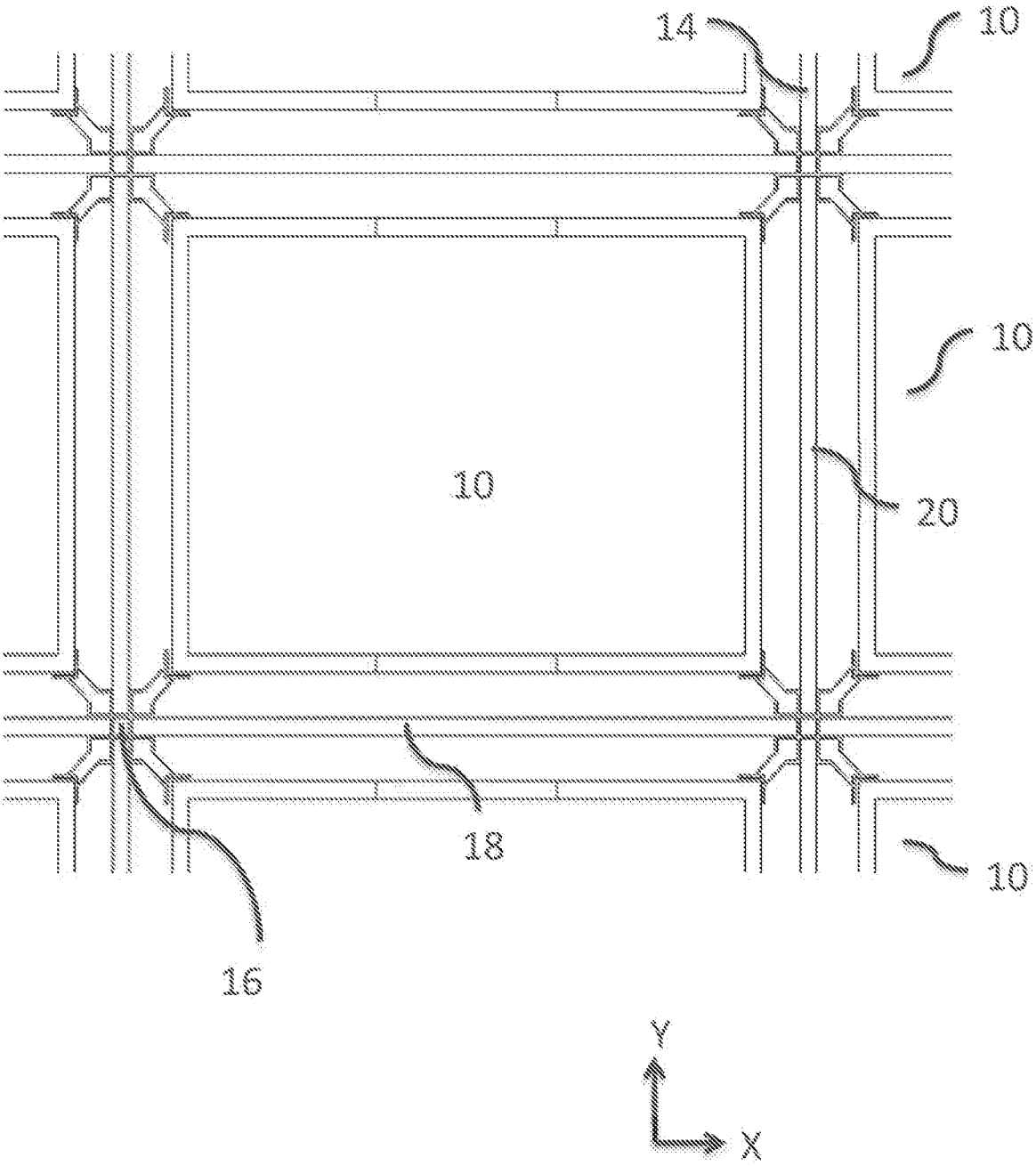
Figure 11 (PRIOR ART)
FIG. 11 is a schematic plan view of part of the framework structure of FIG. 10.

As shown in FIGS. 10 and 11, stackable containers, known as bins 10, are stacked on top of one another to form stacks 12. The stacks 12 are arranged in a grid framework structure 14 in a warehousing or manufacturing environment. FIG. 10 is a schematic perspective view of the framework structure 14, and FIG. 11 is a top-down view showing a stack 12 of bins 10 arranged within the framework structure 14. Each bin 10 typically holds a plurality of product items (not shown), and the product items within a bin 10 may be identical, or may be of different product types depending on the application.

The framework structure 14 comprises a plurality of upright members 16 that support horizontal members 18, 20. A first set of parallel horizontal members 18 is arranged perpendicularly to a second set of parallel horizontal members 20 to form a plurality of horizontal grid structures supported by the upright members 16. The members 16, 18, 20 are typically manufactured from metal. The bins 10 are stacked between the members 16, 18, 20 of the framework structure 14, so that the framework structure 14 guards against horizontal movement of the stacks 12 of bins 10, and guides vertical movement of the bins 10.

Figure 12A:
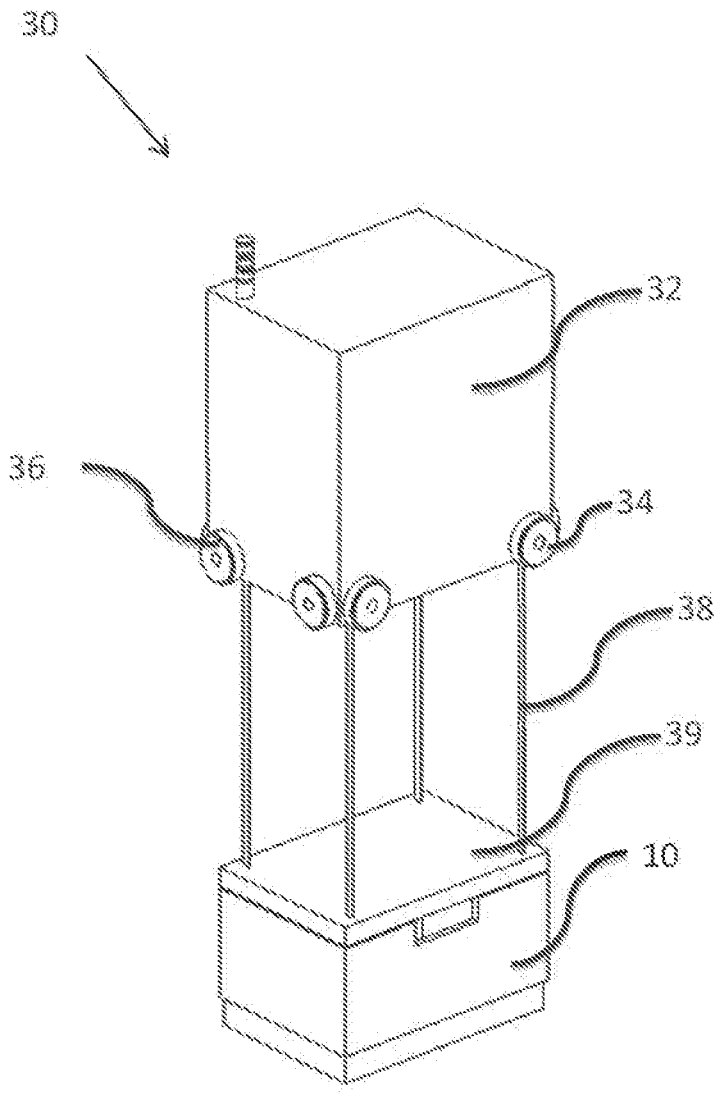
Figure 12a (PRIOR ART)
FIGS. 12(a) and 12(b) are schematic perspective views, from the rear and front respectively, of one form of load handler device for use with the frame structure of FIGS. 10 and 11.
Figures 12B, 12C:
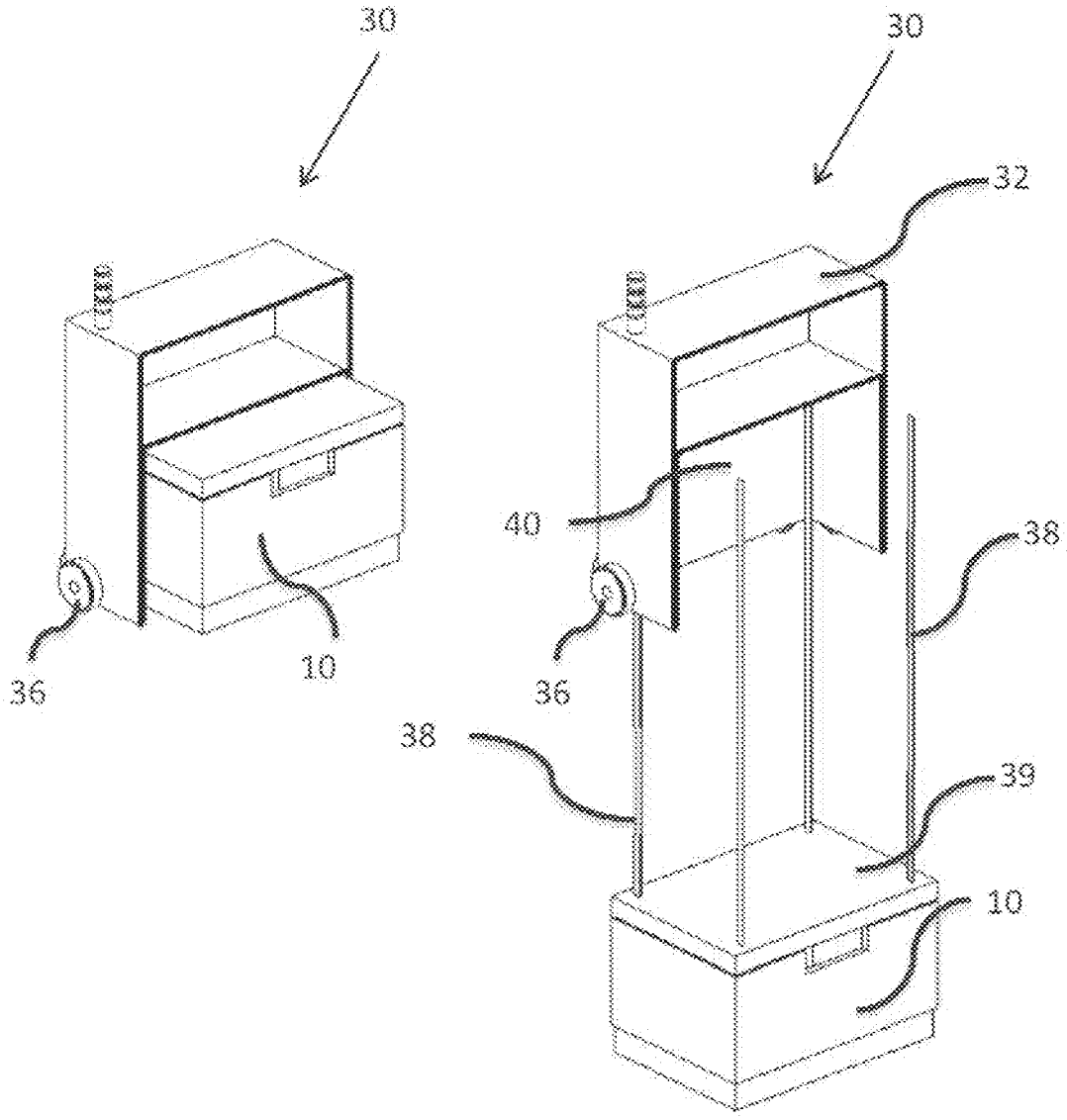
Figure 12b and 12c (PRIOR ART)
FIG. 12(c) is a schematic perspective view of the known load handler device in use lifting a bin.
Figure 13:
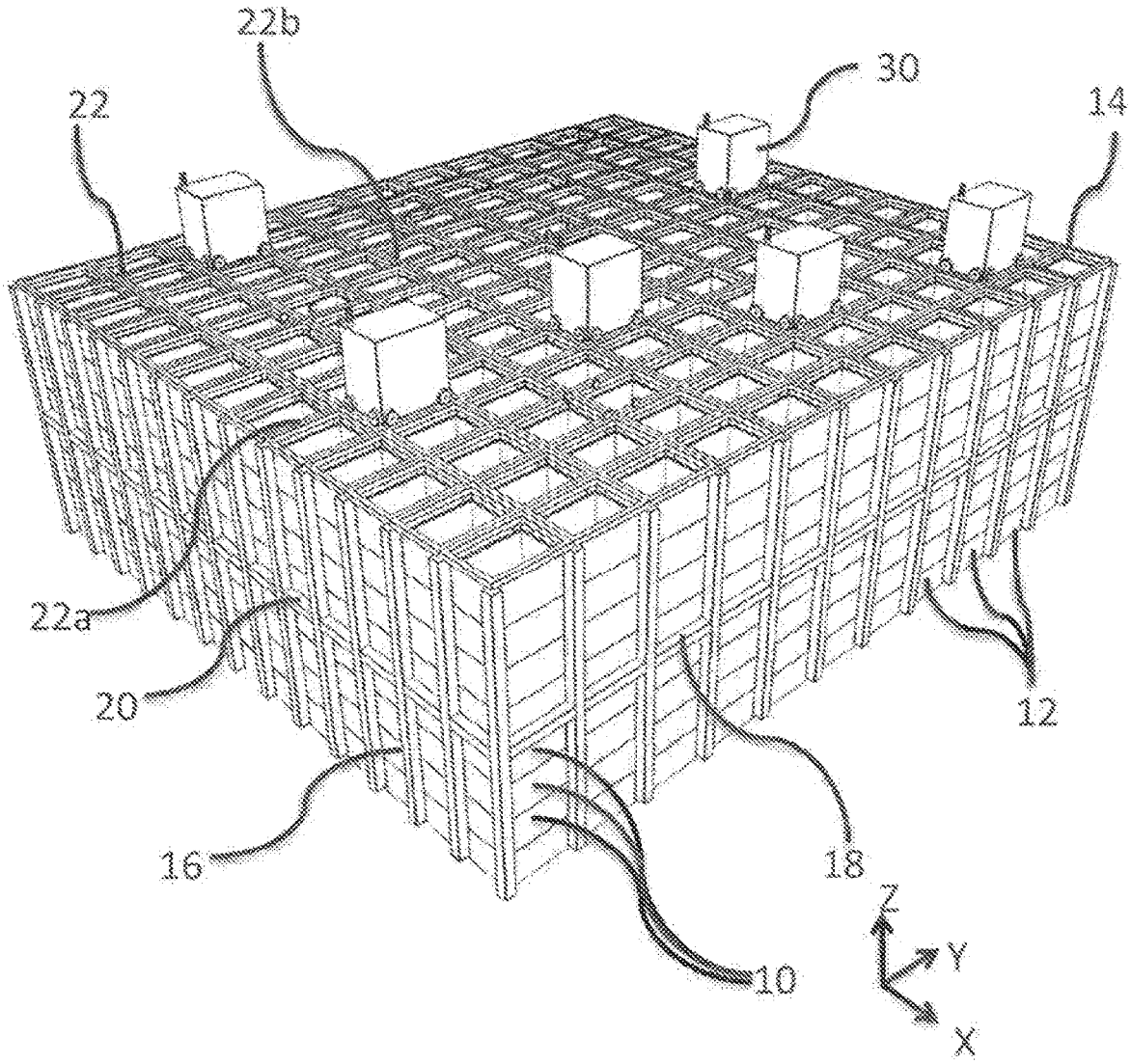
Figure 13 (PRIOR ART)
FIG. 13 is a schematic perspective view of a known storage system comprising a plurality of load handler devices of the type shown in FIGS. 12(a), 12(b) and 12(c), installed on the frame structure of FIGS. 10 and 11, the storage system comprising a plurality of drop off points or output ports.

The top level of the frame structure 14 includes rails 22 arranged in a grid pattern across the top of the stacks 12. Referring additionally to FIGS. 12 and 13, the rails 22 support a plurality of robotic load handling devices 30. A first set 22a of parallel rails 22 guide movement of the load handling devices 30 in a first direction (X) across the top of the frame structure 14, and a second set 22b of parallel rails 22, arranged perpendicular to the first set 22a, guide movement of the load handling devices 30 in a second direction (Y), perpendicular to the first direction. In this way, the rails 22 allow movement of the load handling devices 30 laterally in two dimensions in the horizontal X-Y plane, so that a load handling device 30 can be moved into position above any of the stacks 12.

One form of load handling device 30 is further described in Norwegian patent number 317366, the contents of which are incorporated herein by reference. FIGS. 12(a) and 12(b) are schematic perspective views of a load handling device 30 from the rear and front, respectively, and FIG. 12(c) is a schematic front perspective view of a load handling device 30 lifting a bin 10. However, there are other forms of load handling device that may be used in combination with the system herein described. For example a further form of robotic load handling device is described in PCT Patent Publication No. WO2015/019055, hereby incorporated by reference, (Ocado) where each robotic load handler only covers one grid space of the frame work structure, thus allowing higher density of load handlers and thus higher throughput for a given sized system.

Each load handling device 30 comprises a vehicle 32 which is arranged to travel in the X and Y directions on the rails 22 of the frame structure 14, above the stacks 12. A first set of wheels 34, consisting of a pair of wheels 34 on the front of the vehicle 32 and a pair of wheels 34 on the back of the vehicle 32, is arranged to engage with two adjacent rails of the first set 22a of rails 22. Similarly, a second set of wheels 36, consisting of a pair of wheels 36 on each side of the vehicle 32, is arranged to engage with two adjacent rails of the second set 22b of rails 22. Each set of wheels 34, 36 can be lifted and lowered, so that either the first set of wheels 34 or the second set of wheels 36 is engaged with the respective set of rails 22a, 22b at any one time.

When the first set of wheels 34 is engaged with the first set of rails 22a and the second set of wheels 36 is lifted clear from the rails 22, the wheels 34 can be driven, by way of a drive mechanism (not shown) housed in the vehicle 32, to move the load handling device 30 in the X direction. To move the load handling device 30 in the Y direction, the first set of wheels 34 is lifted clear of the rails 22, and the second set of wheels 36 is lowered into engagement with the second set of rails 22a. The drive mechanism can then be used to drive the second set of wheels 36 to achieve movement in the Y direction.

The load handling device 30 is equipped with a lifting device. The lifting device 40 comprises a gripper plate 39 is suspended from the body of the load handling device 32 by four cables 38. The cables 38 are connected to a winding mechanism (not shown) housed within the vehicle 32. The cables 38 can be spooled in or out from the load handling device 32, so that the position of the gripper plate 39 with respect to the vehicle 32 can be adjusted in the Z direction.

The gripper plate 39 is adapted to engage with the top of a bin 10. For example, the gripper plate 39 may include pins (not shown) that mate with corresponding holes (not shown) in the rim that forms the top surface of the bin 10, and sliding clips (not shown) that are engageable with the rim to grip the bin 10. The clips are driven to engage with the bin 10 by a suitable drive mechanism housed within the gripper plate 39, which is controlled by signals carried by the wireless communications system of the first or second embodiment of the present invention.

The load handling device 30 may further comprise a controller. The controller comprising means for communicating with the gripper plate 39 of the lift device 40. The gripping plate 39, when engaged with the bin 10, communicates with the load handling device 30 to instruct lifting of the bin 10.

In the above example, relative movement between the gripper plate 39 and the controller of the load handling device 30 is inevitable and communications may be lost resulting in stalling of the lift or failure to engage the bin 10. Accordingly, applying the wireless communication system and controller as envisaged in each of the first and second embodiments above provide the advantage of permitting wireless communications to be maintained in the event of such relative movement.

To remove a bin 10 from the top of a stack 12, the load handling device 30 is moved as necessary in the X and Y directions so that the gripper plate 39 is positioned above the stack 12. The gripper plate 39 is then lowered vertically in the Z direction to engage with the bin 10 on the top of the stack 12, as shown in FIG. 3(c). The gripper plate 39 grips the bin 10, and is then pulled upwards on the cables 38, with the bin 10 attached. At the top of its vertical travel, the bin 10 is accommodated within the vehicle body 32 and is held above the level of the rails 22. In this way, the load handling device 30 can be moved to a different position in the X-Y plane, carrying the bin 10 along with it, to transport the bin 10 to another location. The cables 38 are long enough to allow the load handling device 30 to retrieve and place bins from any level of a stack 12, including the floor level. The vehicle 32 is sufficiently heavy to counterbalance the weight of the bin 10 and to remain stable during the lifting process. The weight of the vehicle 32 may be comprised in part of batteries that are used to power the drive mechanism for the wheels 34, 36.

As shown in FIG. 13, a plurality of identical load handling devices 30 are provided, so that each load handling device 30 can operate simultaneously to increase the throughput of the system. The system illustrated in FIG. 13 includes two specific locations, known as ports 24, at which bins 10 can be transferred into or out of the system. An additional conveyor system (not shown) is associated with each port 24, so that bins 10 transported to a port 24 by a load handling device 30 can be transferred to another location by the conveyor system, for example to a picking station (not shown). Similarly, bins 10 can be moved by the conveyor system to a port 24 from an external location, for example to a bin-filling station (not shown), and transported to a stack 12 by the load handling devices 30 to replenish the stock in the system.

Each load handling device 30 can lift and move one bin 10 at a time. If it is necessary to retrieve a bin 10 ("target bin") that is not located on the top of a stack 12, then the overlying bins 10 ("non-target bins") must first be moved to allow access to the target bin 10. This is achieved in an operation referred to hereafter as "digging".

Referring to FIG. 13, during a digging operation, one of the load handling devices 30 sequentially lifts each non-target bin 10a from the stack 12 containing the target bin 10b and places it in a vacant position within another stack 12. The target bin 10b can then be accessed by the load handling device 30 and moved to a port 24 for further transportation.

Each of the load handling devices 30 is under the control of a central computer. Each individual bin 10 in the system is tracked, so that the appropriate bins 10 can be retrieved, transported and replaced as necessary. For example, during a digging operation, the locations of each of the non-target bins 10a is logged, so that the non-target bins 10a can be tracked.

The system described with reference to FIGS. 10 to 13 has many advantages and is suitable for a wide range of storage and retrieval operations. In particular, it allows very dense storage of product, and it provides a very economical way of storing a huge range of different items in the bins 10, while allowing reasonably economical access to all of the bins 10 when required for picking.

However, there are some drawbacks with such a system, which all result from the above-described digging operation that must be performed when a target bin 10b is not at the top of a stack 12.

It will be appreciated that this is one example only of the use of the system described above and that the invention is not limited to such a use. Moreover, any other system requiring communication between two objects in which movement between the objects is anticipated may benefit.

The foregoing description of embodiments of the invention has been presented for the purpose of illustration and description. It is not intended to be exhaustive or to limit the invention to the precise form disclosed. Modifications and variations can be made without departing from the spirit and scope of the present invention.

The invention claimed is:

[1. A controller for a wireless communication system, the wireless communication system having:

a plurality of emitters physically separated from each other;

a first lens through which emissions from the plurality of emitters pass;

a second lens through which the emissions passed through the first lens pass;

at least one receiver; and a tilt sensor arranged to measure angle of tilt in at least one dimension of the plurality of emitters, wherein the second lens is arranged to focus emissions passed through the first lens onto the at least one receiver, wherein the controller is configured to determine an intensity of emission to be emitted by each of plural emitters based on a measured angle of tilt in at least one dimension of the plural emitters, such that the emissions will be incident on at least one selected at least one receiver, and wherein the controller is configured to control plural emitters so that emissions from the plural emitters will arrive at a same receiver so as to achieve a specific signalling effect.]

[2. The controller according to claim 1, wherein the controller is configured to control plural emitters so that the emissions will be vertical relative to the plural emitters.]

[3. The controller according to claim 1, wherein the controller is configured to control plural emitters so that the emissions will not be vertical and direct emissions to at least one selected at least one receiver.]

[4. A wireless communication system, comprising:

a plurality of emitters physically separated from each other;

a first lens through which emissions from the plurality of emitters pass;

a second lens through which the emissions passed through the first lens pass;

at least one receiver;

a tilt sensor arranged to measure the angle of tilt in at least one dimension of the plurality of emitters; and a controller according to claim 1, wherein the second lens is arranged to focus emissions passed through the first lens onto the at least one receiver.]

[5. The wireless communications system according to claim 4, wherein the emissions of the plurality of emitters are selected to be within the infra-red spectrum.]

[6. The wireless communications system according to claim 4, wherein the emissions of the plurality of emitters are radio frequency transmissions with frequencies greater than 1 GHz.]

[7. A wireless communication system, comprising:

a wireless communication system according to claim 4; and a second wireless communication system according to claim 4, wherein the first and second wireless communication systems are arranged to perform bi-directional communications.]

[8. A robotic warehousing system comprising:

at least one robotic load handling means having a controlling means and a lifting means arranged to be lowered from within the robotic load handling means, wherein the lifting means includes a gripping means configured to grip and lift a load, the load having a container, wherein the robotic load handling means includes a wireless communication system according to claim 4, such that the lifting means will communicate with the controlling means by way of the wireless communication system.]

9. A wireless communication system, comprising:

a plurality of emitters physically separated from each other;

a first lens through which emissions from the plurality of emitters pass;

a second lens through which the emissions passed through the first lens pass;

a plurality of receivers;

a tilt sensor arranged to measure angle of tilt in at least one dimension of the plurality of emitters;

a controller, wherein the second lens is arranged to focus emissions passed through the first lens onto the at least one receiver of the plurality of receivers, wherein the controller is configured to determine an intensity of emission to be emitted by each of plural emitters based on a measured angle of tilt in at least one dimension of the plural emitters, such that the emissions will be incident on at least one selected at least one receiver;

a second tilt sensor co-located with the plurality of receivers and arranged to measure the angle of tilt in at least one dimension of the plurality of receivers; and a second controller co-located with the plurality of receivers and arranged to adjust the gain of each of the plurality of receivers based on the measured angle of tilt of the plurality of receivers.

[10. A controller for a wireless communication system, the wireless communication system having:

a plurality of emitters physically separated from each other;

a first lens system co-located with the plurality of emitters through which emissions from the plurality of emitters are to pass;

a second lens system through which the emissions passed through the first lens system are to pass;

a plurality of receivers;

a measurement means arranged to measure intensity of emissions incident on each of the plurality of receivers;

a transmission means co-located with the plurality of receivers; and a reception means co-located with the plurality of emitters, wherein the second lens system is co-located with the plurality of receivers and arranged to focus emissions passed through the first lens systems onto the plurality of receivers, the transmission means is arranged to transmit the measured intensities to the reception means, and the controller is configured to determine an intensity of emission emissions to be emitted by each of the plural emitters based on the measured intensities, such that the emissions will be incident on at least one selected receiver of the plural receivers.]

[11. The controller according to claim 10, wherein the controller is configured to control the plural emitters so that emissions will be vertical relative to the plural emitters.]

[12. The controller according to claim 10, wherein the controller is configured to control the plural emitters so that emissions will not be vertical and direct emissions to at least one chosen receiver of the plurality of receivers.]

[13. The controller according to claim 12, wherein the controller is configured to control the plural emitters so that emissions from the plural emitters will arrive at a same receiver of the plural receivers so as to achieve a specific signalling effect.]

[14. The controller according to claim 10, wherein the controller is configured to control each of the plural emitters to emit to a specific receiver of the plurality of receivers and arranged to control each of the plural emitters such that each receiver will only receive emissions from one emitter at any one time.]

[15. A wireless communication system comprising:

a plurality of emitters physically separated from each other;

a first lens system co-located with the plurality of emitters through which emissions from the plurality of emitters pass;

a second lens system through which the emissions passed through the first lens system pass;

a plurality of receivers;

a measurement means arranged to measure the intensity of emissions incident on each of the plurality of receivers;

a transmission means co-located with the plurality of receivers;

a reception means co-located with the plurality of emitters; and a controller according to claim 10, wherein the second lens system is co-located with the plurality of receivers and arranged to focus emissions passed through the first lens systems onto the plurality of receivers, and the transmission means is arranged to transmit measured intensities to the reception means.]

[16. The wireless communications system according to claim 15, wherein the emissions of the plurality of emitters are selected to be within the infra-red spectrum.]

[17. The wireless communications system according to claim 15, wherein the emissions of the plurality of emitters are radio frequency transmissions with frequencies greater than 1 GHz.]

[18. The wireless communications system according to claim 15, wherein the transmission means and reception means are configured to transmit and receive via at least one of: radio frequency communications and optical communications.]

[19. The wireless communication system according to claim 15, comprising:

a tilt sensor co-located with the plurality of receivers and arranged to measure the angle of tilt in at least one dimension of the plurality of receivers; and a second controller co-located with the plurality of receivers and configured to adjust a gain of each of the plurality of receivers based on the measured angle of tilt of the plurality of receivers.]

[20. A wireless communication system comprising:

a first wireless communication system according to claim 15; and a second wireless communication system according to claim 15, wherein the first and second wireless communication systems are arranged to perform bi-directional communications.]

[21. A method of controlling a wireless communication system, the wireless communication system having a plurality of emitters physically separated from each other;

a first lens through which emissions from the plurality of emitters pass;

a second lens through which the emissions passed through the first lens pass, at least one receiver; and a tilt sensor arranged to measure the angle of tilt in at least one dimension of the plurality of emitters, wherein the second lens is arranged to focus the emissions passed through the first lens onto the at least one receiver, the method comprising:

determining an intensity of emission to be emitted by each of the plurality of emitters based on the angle of tilt in at least one dimension of the plurality of emitters, such that the emissions are incident on at least one selected at least one receiver, wherein the determining comprises controlling the plurality of emitters so that emissions from the plurality of emitters arrive at a same receiver so as to achieve a specific signalling effect.]

[22. The method according to claim 21, wherein the determining comprises:

controlling the plurality of emitters so that the emissions are vertical relative to the plurality of emitters.]

[23. The method according to claim 21, wherein the determining comprises:

controlling the plurality of emitters so that the emissions are not vertical and direct emissions to at least one selected at least one receiver.]

24. A method of controlling a wireless communication system, the wireless communication system having a plurality of emitters physically separated from each other;

a first lens through which emissions from the plurality of emitters pass;

a second lens through which the emissions passed through the first lens pass;

a plurality of receivers;

a tilt sensor arranged to measure the angle of tilt in at least one dimension of the plurality of emitters;

a second tilt sensor co-located with the plurality of receivers and arranged to measure the angle of tilt in at least one dimension of the plurality of receivers, wherein the second lens is arranged to focus the emissions passed through the first lens onto at least one receiver of the plurality of receivers, the method comprising:

determining an intensity of emission to be emitted by each of the plurality of emitters based on the angle of tilt in at least one dimension of the plurality of emitters, such that the emissions are incident on at least one selected at least one receiver; and adjusting a gain of each of the plurality of receivers based on the measured angle of tilt of the plurality of receivers.

[25. A method of controlling a wireless communication system, the wireless communication system having a plurality of emitters physically separated from each other;

a first lens system co-located with the plurality of emitters through which emissions from the plurality of emitters pass;

a second lens system through which the emissions passed through the first lens system pass;

a plurality of receivers;

a measurement means arranged to measure the intensity of emissions incident on each of the plurality of receivers;

a transmission means co-located with the plurality of receivers; and a reception means co-located with the plurality of emitters, wherein the second lens system is co-located with the plurality of receivers and arranged to focus the emissions passed through the first lens systems onto the plurality of receivers, the transmission means being arranged to transmit measured intensities to the reception means, the method comprising:

determining an intensity of emission to be emitted by each of the plurality of emitters based on the measured intensities, such that the emissions are incident on at least one selected receiver of the plurality of receivers.]

[26. The method according to claim 25, wherein the determining comprises:

controlling the plurality of emitters so that the emissions are vertical relative to the plurality of emitters.]

[27. The method according to claim 25, wherein the determining comprises:

controlling the plurality of emitters so that the emissions are not vertical and direct emissions to at least one chosen one of the plurality of receivers.]

[28. The method according to claim 25, wherein the determining comprises:

controlling the plurality of emitters so that transmissions from the plurality of emitters arrive at the same receiver of the plurality of receivers so as to achieve a specific signalling effect.]

[29. The method according to claim 25, wherein the determining comprises:

controlling each of the plurality of emitters to emit to a specific receiver of the plurality of receivers and arranged to control each of the plurality of emitters such that each receiver only receives emissions from one emitter at any one time.]

[30. The method according to claim 25, wherein the wireless communications system includes a tilt sensor co-located with the plurality of receivers and arranged to measure the angle of tilt in at least one dimension of the plurality of receivers, the method comprising:

adjusting a gain of each of the plurality of receivers based on the measured angle of tilt of the plurality of receivers.]

* * * * *